United States Patent

Cheslock et al.

[19]

[11] Patent Number: 6,030,117
[45] Date of Patent: Feb. 29, 2000

[54] TYMPANIC THERMOMETER PROBE COVER

[75] Inventors: Edward P. Cheslock, Lincoln University; Eric L. Canfield, Chester Springs; Richard K. Harris, West Chester, all of Pa.

[73] Assignee: TruTek, Inc., West Chester, Pa.

[21] Appl. No.: 08/867,838

[22] Filed: Jun. 3, 1997

Related U.S. Application Data

[63] Continuation-in-part of application No. 08/747,423, Nov. 12, 1996, Pat. No. 5,833,367.

[51] Int. Cl.[7] ............................... G01K 1/08; A61B 6/00
[52] U.S. Cl. ......................... 374/158; 374/121; 600/184
[58] Field of Search .................................. 374/158, 209, 374/121; 600/549, 474, 200, 203, 186, 184; 206/306

[56] References Cited

U.S. PATENT DOCUMENTS

| | | |
|---|---|---|
| Re. 34,507 | 1/1994 | Egawa et al. . |
| Re. 34,599 | 5/1994 | Susyznski et al. . |
| Re. 34,789 | 11/1994 | Fraden . |
| D. 218,851 | 9/1970 | Sato . |
| D. 246,766 | 12/1977 | Everest . |
| D. 254,959 | 5/1980 | Everest . |
| D. 300,728 | 4/1989 | Ross . |
| D. 303,008 | 8/1989 | O'Hara et al. . |
| D. 317,414 | 6/1991 | Lanci et al. . |
| D. 318,812 | 8/1991 | Matsuura et al. . |
| D. 321,487 | 11/1991 | Manno . |
| D. 329,389 | 9/1992 | Hines . |
| D. 329,395 | 9/1992 | Mackay . |

(List continued on next page.)

FOREIGN PATENT DOCUMENTS

| | | |
|---|---|---|
| 66021/86 | of 0000 | Australia . |
| 778199 | 2/1972 | Belgium . |
| 1258052 | 8/1989 | Canada . |

(List continued on next page.)

OTHER PUBLICATIONS

J. W. Moore et al., "Noncontact tympanic thermometer", *Medical & Biological Engineering & Computing*, vol. 16, No. 5, Sep. 1978, pp. 580–584.

D. E. Lees et al., "Noninvasive Determination of Core Temperature During Anesthesia", *Southern Medical Journal*, vol. 73, No. 10, Oct. 1980, pp. 1322–1324.

J. Fraden et al., "Application of Pyro–Electro Polymer Film to Medical Thermometry", *Proceedings of the Eight Annual Conference of the IEEE/Engineering in Medicine and Biology Society*, 86CH2368.9, vol. 3 of 2, Forth Worth, Texas, Nov. 7–10, 1986.

(List continued on next page.)

*Primary Examiner*—Christopher W. Fulton
*Attorney, Agent, or Firm*—Nixon & Vanderhye P.C.

[57] ABSTRACT

A disposable probe cover for an electronic tympanic ("ear") thermometer is made of closed-cell foam that is laminated with a sheet of high density polyethylene plastic film substantially transparent to infrared radiant energy. The probe cover is hollow, defining a central passageway that accepts an oversized probe and can potentially accommodate a variety of different probe configurations. The foam construction allows the probe cover to stretch over the oversized probe—retaining the probe cover on the probe during use. The foam construction also allows the probe cover to deform when inserted into a patient's ear—sealing the patient's ear canal to prevent external heat and light from affecting the measurement, and providing a high degree of cushioning and comfort not available in any prior disposable probe cover design. The film laminate and foam provide a barrier that is impervious to germs, fluids and other secretions—further reducing the already low risk of cross-contamination. The probe cover design facilitates accurate, repeatable measurements using a temperature measuring instrument based on receiving and analyzing the radiant infrared heat energy emitted by the tympanic membrane (eardrum).

14 Claims, 13 Drawing Sheets

U.S. PATENT DOCUMENTS

| | | |
|---|---|---|
| D. 329,396 | 9/1992 | Mackay . |
| D. 336,862 | 6/1993 | Ayton et al. . |
| D. 337,534 | 7/1993 | Swift . |
| D. 337,954 | 8/1993 | Makita et al. . |
| D. 338,412 | 8/1993 | Curbbun . |
| D. 342,681 | 12/1993 | Mackay . |
| D. 370,860 | 6/1996 | Pompei et al. . |
| 738,960 | 9/1903 | Vaughan et al. . |
| 1,363,259 | 12/1920 | Mills . |
| 2,696,117 | 12/1954 | Harrison . |
| 2,804,069 | 8/1957 | Schwamm et al. . |
| 2,844,031 | 7/1958 | Rosenthal . |
| 2,848,998 | 8/1958 | Bryan . |
| 2,877,500 | 3/1959 | Rainer et al. . |
| 2,904,480 | 9/1959 | Rainer et al. . |
| 2,969,141 | 1/1961 | Katzin . |
| 2,972,991 | 2/1961 | Burke . |
| 3,023,398 | 2/1962 | Siegert . |
| 3,054,397 | 9/1962 | Benzinger . |
| 3,156,117 | 11/1964 | Benzinger . |
| 3,179,805 | 4/1965 | Astheimer . |
| 3,190,436 | 6/1965 | Diamant . |
| 3,193,978 | 7/1965 | Bader . |
| 3,234,593 | 2/1966 | Lerner et al. . |
| 3,277,715 | 10/1966 | Vanderschmidt . |
| 3,282,106 | 11/1966 | Barnes . |
| 3,301,394 | 1/1967 | Baermann et al. . |
| 3,335,715 | 8/1967 | Hugenholtz et al. . |
| 3,349,896 | 10/1967 | Ensign et al. . |
| 3,367,186 | 2/1968 | Ensign et al. . |
| 3,368,076 | 2/1968 | Clifford . |
| 3,465,149 | 9/1969 | Flint . |
| 3,469,449 | 9/1969 | Keller . |
| 3,469,685 | 9/1969 | Baermann . |
| 3,491,596 | 1/1970 | Dean . |
| 3,500,280 | 3/1970 | Ensign . |
| 3,507,153 | 4/1970 | Jones et al. . |
| 3,526,135 | 9/1970 | Wortz . |
| 3,531,642 | 9/1970 | Barnes et al. . |
| 3,531,992 | 10/1970 | Moore . |
| 3,581,570 | 6/1971 | Wortz . |
| 3,605,750 | 9/1971 | Sheridan et al. . |
| 3,626,757 | 12/1971 | Benzinger . |
| 3,641,345 | 2/1972 | Coackley et al. . |
| 3,650,153 | 3/1972 | Schwab . |
| 3,653,263 | 4/1972 | Poole et al. . |
| 3,663,917 | 5/1972 | Mahmoodi . |
| 3,673,868 | 7/1972 | Beury, III et al. . |
| 3,678,751 | 7/1972 | Mead et al. . |
| 3,681,991 | 8/1972 | Eberly, Jr. . |
| 3,701,347 | 10/1972 | Belkin . |
| 3,703,892 | 11/1972 | Meyers . |
| 3,719,396 | 3/1973 | VanDeWalker et al. . |
| 3,724,448 | 4/1973 | Lima . |
| 3,729,998 | 5/1973 | Mueller et al. . |
| 3,735,864 | 5/1973 | Eckhart . |
| 3,738,172 | 6/1973 | Sato . |
| 3,738,173 | 6/1973 | Sato . |
| 3,738,479 | 6/1973 | Sato . |
| 3,738,892 | 6/1973 | Curcio . |
| 3,742,191 | 6/1973 | Poole et al. . |
| 3,750,471 | 8/1973 | Bremer . |
| 3,777,568 | 12/1973 | Risgin et al. . |
| 3,781,748 | 12/1973 | Bishop et al. . |
| 3,781,837 | 12/1973 | Anderson et al. . |
| 3,798,366 | 3/1974 | Hunt et al. . |
| 3,809,228 | 5/1974 | Fowler et al. . |
| 3,809,229 | 5/1974 | Wahlig . |
| 3,809,920 | 5/1974 | Cohen et al. . |
| 3,812,847 | 5/1974 | Moore et al. . |
| 3,812,897 | 5/1974 | Latinen . |
| 3,822,593 | 7/1974 | Oudewaal . |
| 3,822,598 | 7/1974 | Brothers et al. . |
| 3,832,669 | 8/1974 | Mueller et al. . |
| 3,833,115 | 9/1974 | Schapker . |
| 3,834,238 | 9/1974 | Mueller et al. . |
| 3,838,600 | 10/1974 | Ersek et al. . |
| 3,849,530 | 11/1974 | Wyeth et al. . |
| 3,851,029 | 11/1974 | Cornett, III et al. . |
| 3,878,836 | 4/1975 | Twentier . |
| 3,880,282 | 4/1975 | Naumann . |
| 3,929,018 | 12/1975 | Turner . |
| 3,942,891 | 3/1976 | Spielberger et al. . |
| 3,949,740 | 4/1976 | Twentier . |
| 3,987,899 | 10/1976 | Vyprachticky . |
| 3,999,434 | 12/1976 | Yen . |
| 3,999,537 | 12/1976 | Noiles . |
| 4,005,605 | 2/1977 | Michael . |
| 4,022,855 | 5/1977 | Hamblen . |
| 4,024,397 | 5/1977 | Weiner . |
| 4,054,057 | 10/1977 | Kluge . |
| 4,061,226 | 12/1977 | Essen . |
| 4,062,239 | 12/1977 | Fowler et al. . |
| 4,081,678 | 3/1978 | Macall . |
| 4,091,922 | 5/1978 | Egler . |
| 4,117,926 | 10/1978 | Turner et al. . |
| 4,147,304 | 4/1979 | Mull . |
| 4,159,766 | 7/1979 | Kluge . |
| 4,166,389 | 9/1979 | Montren . |
| 4,166,454 | 9/1979 | Meijer . |
| 4,168,626 | 9/1979 | Fullager . |
| 4,183,248 | 1/1980 | West . |
| 4,191,197 | 3/1980 | Benzinger . |
| 4,193,396 | 3/1980 | Wacker . |
| 4,197,944 | 4/1980 | Catlin . |
| 4,201,222 | 5/1980 | Haase . |
| 4,226,910 | 10/1980 | Dahlen et al. . |
| 4,233,512 | 11/1980 | Rupert . |
| 4,241,828 | 12/1980 | Bourdelle et al. . |
| 4,271,358 | 6/1981 | Schwarz . |
| 4,275,591 | 6/1981 | Wand . |
| 4,297,685 | 10/1981 | Brainard, II . |
| 4,301,682 | 11/1981 | Everest . |
| 4,312,357 | 1/1982 | Andersson et al. . |
| 4,315,150 | 2/1982 | Darringer et al. . |
| 4,341,992 | 7/1982 | Goldstein . |
| 4,343,182 | 8/1982 | Pompei . |
| 4,343,185 | 8/1982 | Knute . |
| 4,350,166 | 9/1982 | Mobarry . |
| 4,351,616 | 9/1982 | Farnstrom et al. . |
| 4,362,166 | 12/1982 | Furler et al. . |
| 4,372,690 | 2/1983 | Berman et al. . |
| 4,378,489 | 3/1983 | Chabinsky et al. . |
| 4,379,971 | 4/1983 | Smith et al. . |
| 4,380,998 | 4/1983 | Kieffer, III et al. . |
| 4,392,005 | 7/1983 | Mohrman . |
| 4,400,341 | 8/1983 | Sorensen . |
| 4,414,980 | 11/1983 | Mott . |
| 4,420,265 | 12/1983 | Everest et al. . |
| 4,425,921 | 1/1984 | Fujisaki et al. . |
| 4,433,924 | 2/1984 | Quinn, III . |
| 4,436,438 | 3/1984 | Voznick . |
| 4,454,370 | 6/1984 | Viznick . |
| 4,456,390 | 6/1984 | Junkert et al . |
| 4,457,633 | 7/1984 | Andrews . |
| 4,471,354 | 9/1984 | Smith . |
| 4,475,554 | 10/1984 | Hyndman . |
| 4,481,417 | 11/1984 | Inglee . |
| 4,487,208 | 12/1984 | Kamens . |
| 4,493,564 | 1/1985 | Epstein . |
| 4,494,881 | 1/1985 | Everest . |
| 4,509,522 | 4/1985 | Manuccia et al. . |

| | | | | | | |
|---|---|---|---|---|---|---|
| 4,510,115 | 4/1985 | Gokcen et al. | | 5,178,464 | 1/1993 | Fraden . |
| 4,515,165 | 5/1985 | Carroll . | | 5,179,936 | 1/1993 | O'Hara et al. . |
| 4,524,779 | 6/1985 | Brown, Jr. . | | 5,183,337 | 2/1993 | Pompei . |
| 4,527,896 | 7/1985 | Irani et al. . | | 5,188,459 | 2/1993 | Mino et al. . |
| 4,537,791 | 8/1985 | Tarjan . | | 5,199,436 | 4/1993 | Pompei et al. . |
| 4,566,808 | 1/1986 | Pompei et al. . | | 5,229,612 | 7/1993 | Pompei et al. . |
| 4,572,365 | 2/1986 | Bruno et al. . | | 5,232,284 | 8/1993 | Egawa et al. . |
| 4,588,306 | 5/1986 | Burger et al. . | | 5,264,375 | 11/1993 | Bang et al. . |
| 4,602,642 | 7/1986 | O'Hara et al. . | | 5,271,407 | 12/1993 | Pompei et al. . |
| 4,607,963 | 8/1986 | Ulrickson . | | 5,292,347 | 3/1994 | Pompei . |
| 4,614,442 | 9/1986 | Poncy . | | 5,293,862 | 3/1994 | O'Hara et al. . |
| 4,619,271 | 10/1986 | Burger et al. . | | 5,293,877 | 3/1994 | O'Hara et al. . |
| 4,626,686 | 12/1986 | Pompei et al. . | | 5,313,951 | 5/1994 | Zhao . |
| 4,634,294 | 1/1987 | Christol et al. . | | 5,319,202 | 6/1994 | Pompei . |
| 4,636,091 | 1/1987 | Pompei et al. . | | 5,325,863 | 7/1994 | Pompei . |
| 4,644,163 | 2/1987 | Selander . | | 5,333,784 | 8/1994 | Pompei . |
| 4,652,145 | 3/1987 | Bjornberg . | | 5,340,215 | 8/1994 | Makita et al. . |
| 4,659,234 | 4/1987 | Brouwer . | | 5,352,038 | 10/1994 | Schmidt et al. . |
| 4,662,360 | 5/1987 | O'Hara et al. . | | 5,352,039 | 10/1994 | Barral et al. . |
| 4,679,949 | 7/1987 | Sakamoto . | | 5,358,333 | 10/1994 | Schmidt et al. . |
| 4,684,018 | 8/1987 | Jarund . | | 5,368,038 | 11/1994 | Fraden . |
| 4,691,712 | 9/1987 | Brown, Jr. . | | 5,381,796 | 1/1995 | Pompei . |
| 4,727,500 | 2/1988 | Jackson et al. . | | 5,388,907 | 2/1995 | Aoyama et al. . |
| 4,763,522 | 8/1988 | Pompei . | | 5,391,001 | 2/1995 | Rupert et al. . |
| 4,765,752 | 8/1988 | Beynon et al. . | | 5,404,125 | 4/1995 | Mori et al. . |
| 4,784,149 | 11/1988 | Berman et al. . | | 5,411,032 | 5/1995 | Esseff et al. . |
| 4,790,324 | 12/1988 | O'Hara et al. . | | 5,445,158 | 8/1995 | Pompei . |
| 4,797,840 | 1/1989 | Fraden . | | 5,458,121 | 10/1995 | Harada . |
| 4,801,212 | 1/1989 | Imura . | | 5,469,855 | 11/1995 | Pompei et al. . |
| 4,823,949 | 4/1989 | Bala . | | 5,479,931 | 1/1996 | Mooradian . |
| 4,831,258 | 5/1989 | Paulk et al. . | | 5,487,607 | 1/1996 | Makita et al. . |
| 4,854,730 | 8/1989 | Fraden . | | 5,515,847 | 5/1996 | Braig et al. . |
| 4,859,079 | 8/1989 | Wickersheim et al. . | | 5,516,010 | 5/1996 | O'Hara et al. . |
| 4,863,281 | 9/1989 | Suszynski . | | 5,522,662 | 6/1996 | Shiokawa . |
| 4,874,253 | 10/1989 | Pompei et al. . | | 5,528,041 | 6/1996 | Pompei . |
| 4,895,164 | 1/1990 | Wood . | | 5,609,564 | 3/1997 | Makita et al. . |
| 4,900,162 | 2/1990 | Beckman et al. . | | 5,645,350 | 7/1997 | Jang . |
| 4,907,895 | 3/1990 | Everest . | | 5,707,343 | 1/1998 | O'Hara et al. ........................ 374/158 |
| 4,911,559 | 3/1990 | Meyst et al. . | | | | |
| 4,914,673 | 4/1990 | Imura . | | FOREIGN PATENT DOCUMENTS | | |
| 4,919,505 | 4/1990 | Bartosiak et al. . | | | | |
| 4,932,789 | 6/1990 | Egawa et al. . | | 1265355 | 2/1990 | Canada . |
| 4,955,980 | 9/1990 | Masuo . | | 1314407 | 3/1993 | Canada . |
| 4,986,672 | 1/1991 | Beynon . | | 0098402 | 1/1984 | European Pat. Off. . |
| 4,993,419 | 2/1991 | Pompei et al. . | | 0445783A2 | 9/1991 | European Pat. Off. . |
| 4,993,424 | 2/1991 | Suszysnki et al. . | | 0674162A2 | 9/1995 | European Pat. Off. . |
| 5,001,657 | 3/1991 | Yaguro et al. . | | 0715359A1 | 6/1996 | European Pat. Off. . |
| 5,011,296 | 4/1991 | Bartosiak et al. . | | 2167973 | 8/1973 | France . |
| 5,012,813 | 5/1991 | Pompei . | | 2343234 | 9/1977 | France . |
| 5,017,018 | 5/1991 | Iuchi et al. . | | 4422974A1 | 1/1995 | Germany . |
| 5,017,019 | 5/1991 | Pompei et al. . | | 19604201A1 | 8/1997 | Germany . |
| 5,018,872 | 5/1991 | Suszynski et al. . | | 55-154426 | 12/1980 | Japan . |
| 5,024,533 | 6/1991 | Egawa et al. . | | 56-161134 | 12/1981 | Japan . |
| 5,031,619 | 7/1991 | Pompei . | | 56-167428 | 12/1981 | Japan . |
| 5,046,482 | 9/1991 | Everest . | | 57-35739 | 2/1982 | Japan . |
| 5,051,590 | 9/1991 | Kern et al. . | | 57-35740 | 2/1982 | Japan . |
| 5,051,595 | 9/1991 | Kern et al. . | | 57-35741 | 2/1982 | Japan . |
| 5,054,936 | 10/1991 | Fraden . | | 57-212039 | 12/1982 | Japan . |
| 5,056,682 | 10/1991 | Meyst et al. . | | 59-135439 | 9/1984 | Japan . |
| 5,066,142 | 11/1991 | DeFrank et al. . | | 60-187829 | 9/1985 | Japan . |
| 5,081,359 | 1/1992 | Pompei . | | 100319 | 6/1987 | Japan . |
| 5,081,998 | 1/1992 | Yelderman et al. . | | 147818 | 11/1962 | U.S.S.R. . |
| 5,088,834 | 2/1992 | Howe et al. . | | 1425765 | 2/1976 | United Kingdom . |
| 5,094,544 | 3/1992 | Ignatowicz . | | 1518521 | 7/1978 | United Kingdom . |
| 5,127,742 | 7/1992 | Fraden . | | WO95/03666 | 3/1993 | WIPO . |
| 5,150,969 | 9/1992 | Goldberg et al. . | | WO93/19662 | 10/1993 | WIPO . |
| 5,153,563 | 10/1992 | Goto et al. . | | WO95/14913 | 6/1995 | WIPO . |
| 5,159,936 | 11/1992 | Yelderman et al. . | | WO95/18961 | 7/1995 | WIPO . |
| 5,163,418 | 11/1992 | Fraden et al. . | | WO96/07877 | 3/1996 | WIPO . |
| 5,167,235 | 12/1992 | Seacord et al. . | | WO96/19938 | 7/1996 | WIPO . |
| 5,169,235 | 12/1992 | Tominaga et al. . | | | | |
| 5,172,978 | 12/1992 | Nomura et al. . | | | | |

OTHER PUBLICATIONS

J. Fraden, "Application of Piezo/Pyroelectric Films in Medical Tranducers," *Journal of Chemical Engineering*, vol. 13, No. 3, Mar./Apr. 1988, pp. 133–138.

J.M. Looney, Jr. et al., "Ear Thermometry,"*Medical Electronics*, Jun. 1989.

M. Benzinger et al., "Tympanic Clinical Temperature," presented at the Fifth Symposium on Temperature, Washington, D.C., Jun. 21–24, 1971, sponsoered by the National Bureau of Standards, American Institute of Physics, and Instrument Society of American.

Information Sheet, Model 1M, Thermopile Detector, Dexter Research Center, 2 pages, Oct. 1980, Michigan.

Information Sheet. Model 2M, Thermopile Detector, Dexter Research Center, 2 pages, Oct. 1980, Michigan.

Information Sheet, Model M5, Thermopile Detector, Dexter Research Center, 2 pages, Oct. 1980, Michigan.

Information Sheet, Model DR26, Dual Element thermopile Detector, Dexter Research Center, 3 pages, Oct. 1980, Michigan.

Information Sheet, Model DR46, Thermopile Detector, Dexter Research Center, 1 page, Oct. 1979, Michigan.

Informatin Sheet, Model 1010, Low Noise Amplifier, Dexter Research Center, 2 pages, Oct. 1980, Machigan.

Dexter Research Center, Inc., Product Price List—Domestic, 1–1–83.

Y. Houdas, et al., "Human Body Temperature, Its Measurement and Regulation," p. 83, Plemum Press, New York and London (No Date).

Advertisement, "Optical Calibration," Det Tronics, Sunnyvale, CA, *In Tech*, p. 48, Oct. 1987.

P. Gaudet, "Omega Tympanic Infrared Temperature Measuring Instrument, Product Specification," Exergen Corporation, pp. 1–3 (No Date).

ASTM Designation: E 1112–86 (reapproved 1991), "Standard Specification for Electronic Thermometer for Intermittent Determination of Patient Temperature," pp. 1–4 (Reprinted from the Annual Book of ASTM Standards, Philadelphia, PA).

"Electronic thermometers," *Medical Electronics*, Jun. 1996, pp. 118–120.

Schiefercdecker, J., et al., "Infrared thermopile sensors with igh sensitivity and very low temperature coefficeint," *Sensors and Actuators* A 46–47 (1995) 422–427 (printed in the Netherlands).

P.C. Lanchester, "Digital thermometer circuit for silicon diode sensors," *CRYOGENICS* 1989 vol. Dec. 29, (Received May 30, 1989), Southampton, UK, pp. 1156–1159.

Trial Exhibit list from Thermoscan, Inc. V. Sherwood Medical Co. (No Date).

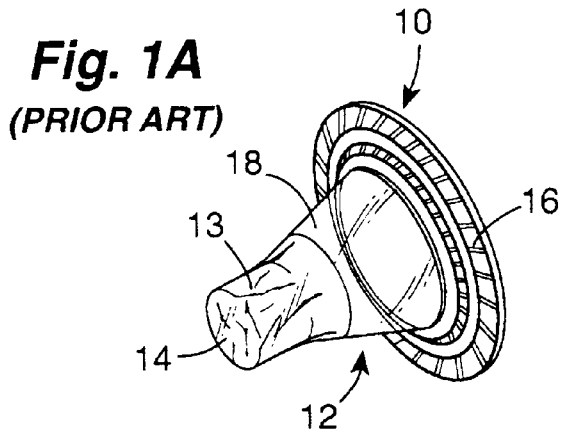
Fig. 1A
(PRIOR ART)
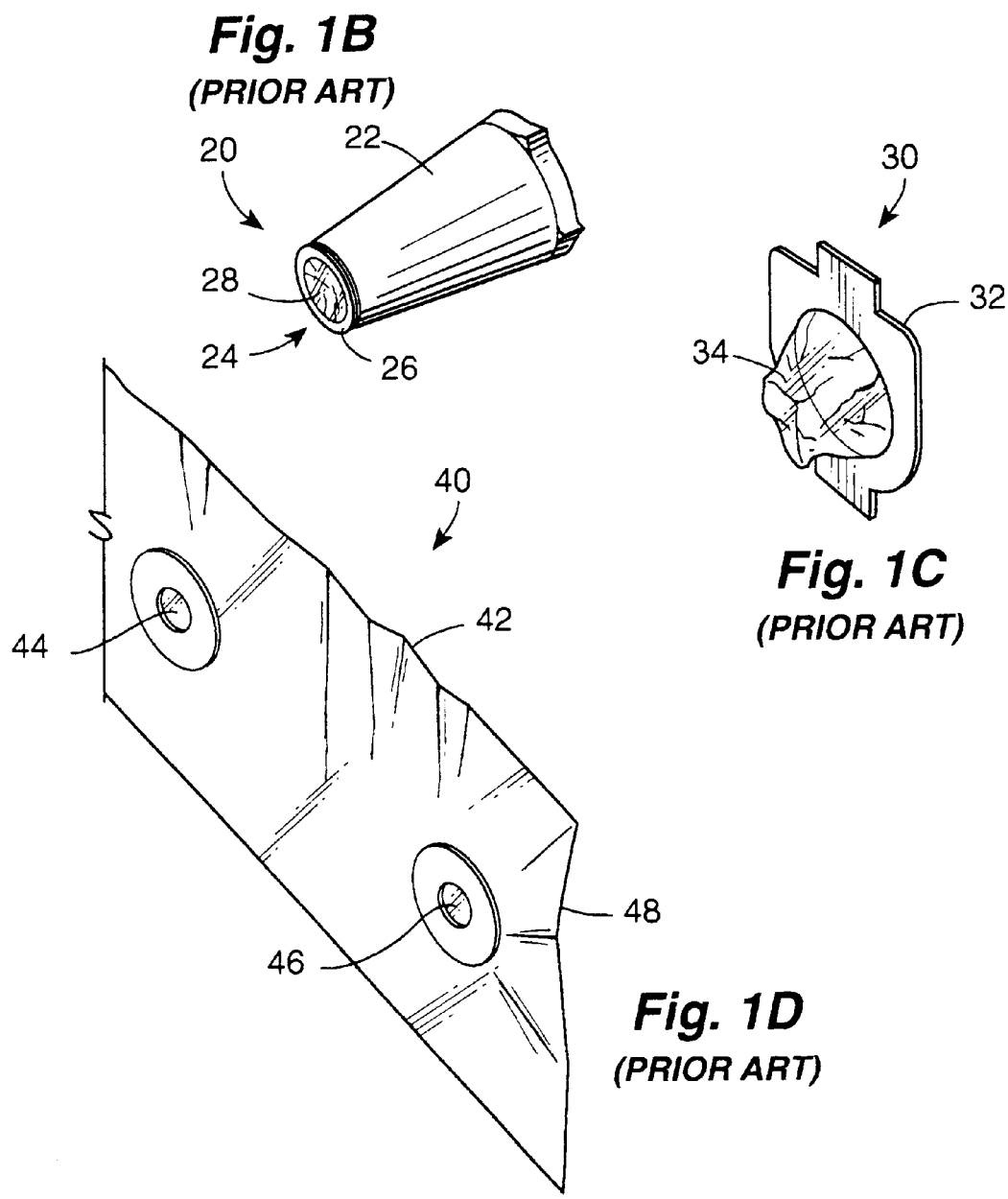
Fig. 1B
(PRIOR ART)
Fig. 1C
(PRIOR ART)
Fig. 1D
(PRIOR ART)

*Fig. 6A*
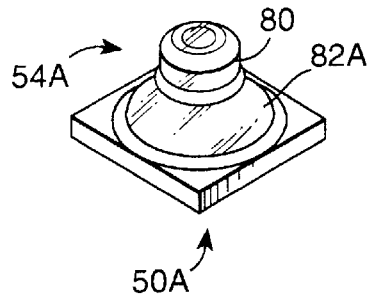
*Fig. 6B*
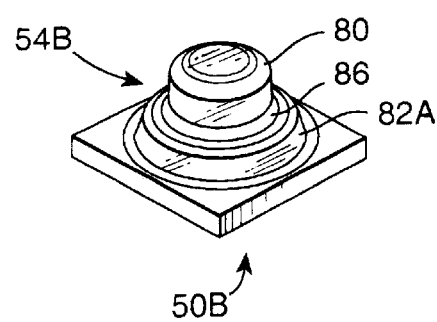
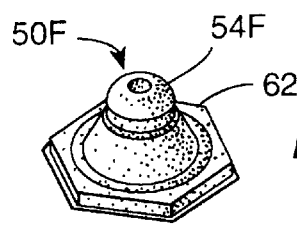
*Fig. 6F*
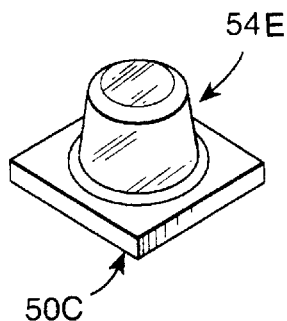
*Fig. 6C*
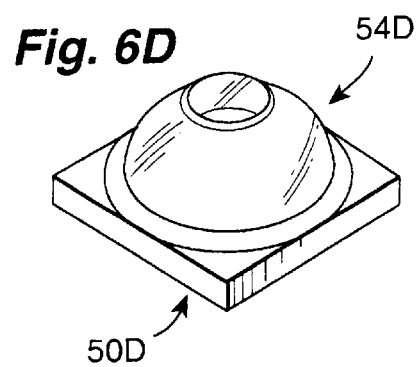
*Fig. 6D*
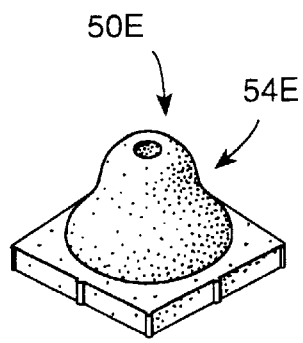
*Fig. 6E*

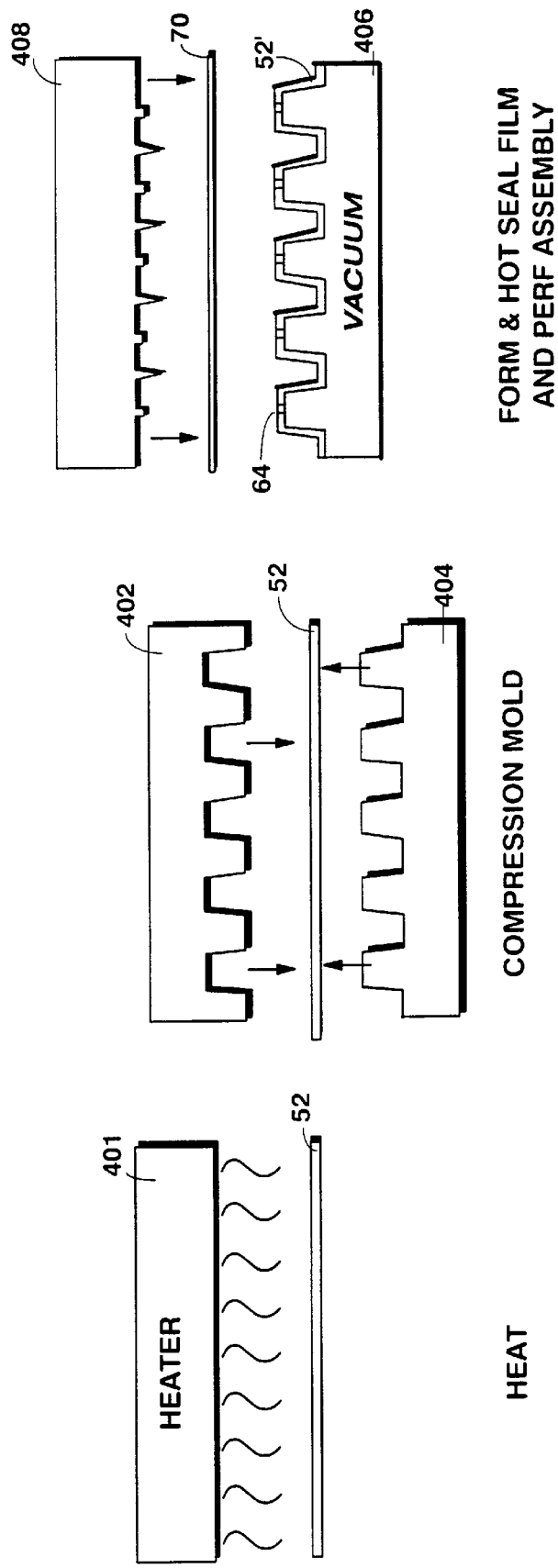

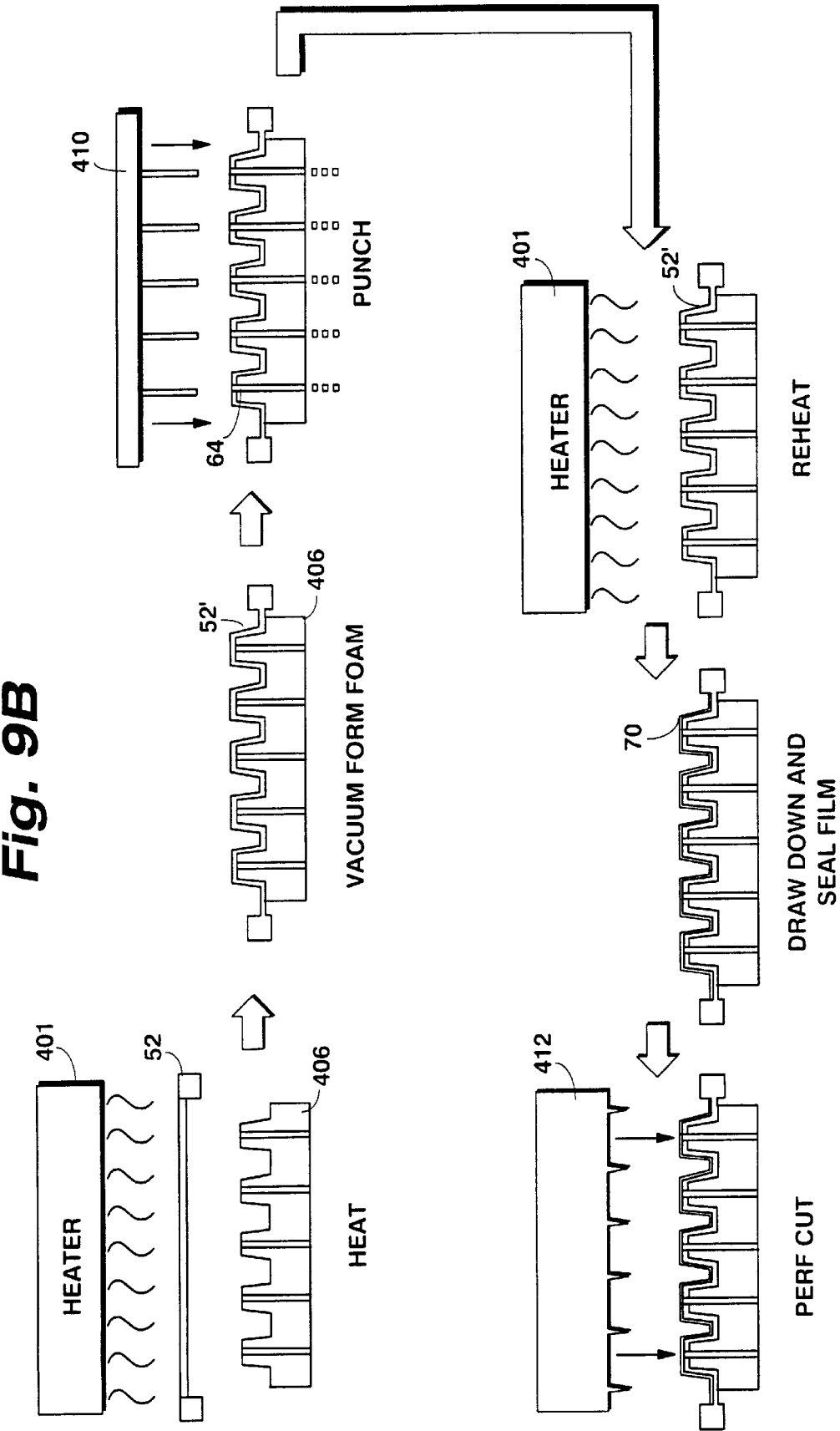

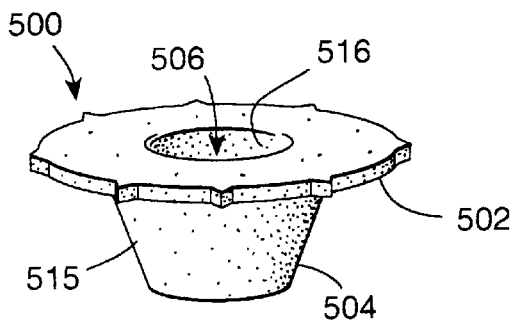
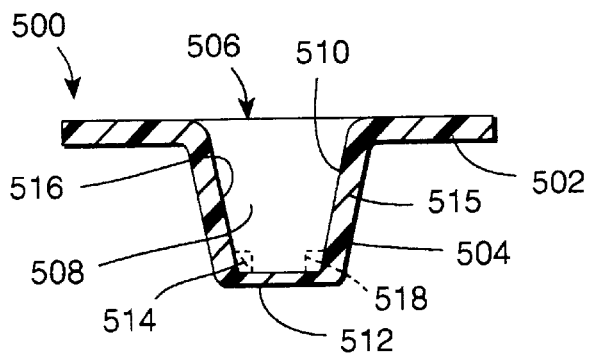
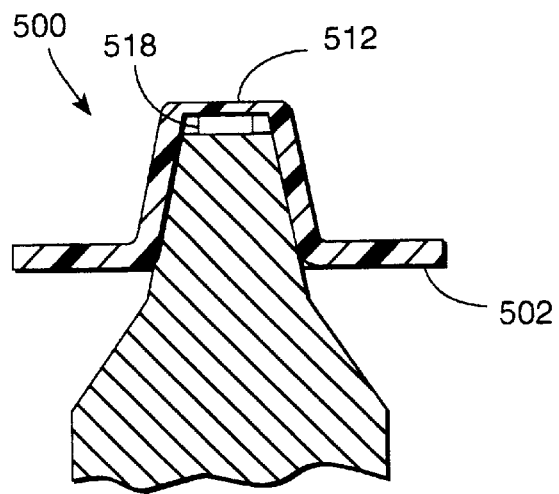

TYMPANIC THERMOMETER PROBE COVER

This is a Continuation-in-Part application of application Ser. No. 08/747,423, filed Nov. 12, 1996, now U.S. Pat. No. 5,833,367.

CROSS-REFERENCE TO RELATED APPLICATIONS

This application is related to commonly-assigned U.S. Provisional Patent Application of Canfield et al no. 60/048,752 entitled "Tympanic Thermometer With Modular Sensing Probe" filed on the same day as this patent application under attorney reference no. 2204-9. The entire disclosure (including the drawings) of that other patent application is incorporated by reference into this patent application.

FIELD OF THE INVENTION

This invention relates to a probe cover for a thermometer that measures temperature by sensing the radiant energy given off by the eardrum ("tympanic membrane"). More particularly, the invention relates to a disposable foam probe cover that increases the comfort, accuracy and repeatability of an ear thermometer temperature measuring system.

BACKGROUND AND SUMMARY OF THE INVENTION

Doctors, nurses, parents, and other care providers all need to be able to rapidly and accurately measure a person's body temperature. To find out whether a person is sick, the first thing a care provider usually does is take the person's temperature. Someone running a fever is likely to have an infection. A doctor or nurse can tell a lot about how a patient is doing by monitoring the patient's temperature over time and noting how it has changed.

There are three kinds of thermometers in wide use today:
glass thermometers,
"electronic" thermometers, and
ear ("tympanic") thermometers.

Glass thermometers are very inexpensive, very small and easy to store, and don't require batteries or other special supplies. For this reason, glass thermometers are probably the most widely used temperature measuring device in the home. However, glass thermometers have the disadvantage that they are very slow in making measurements—they typically require several minutes to reach body temperature. This is uncomfortable for the patient, and may be very troublesome when it is necessary to take the temperature of a small child or an invalid. In addition, glass thermometers are typically accurate only to within a degree, may be susceptible to errors in placement, and can be broken easily.

Because of these disadvantages, most hospitals and doctors' offices now use instruments commonly known as "electronic" thermometers. Most of us have had our temperature taken by an electronic thermometer at one time or another. The electronic thermometer includes a portable, hand-held battery powered unit with a display, and a separate probe. A wire usually connects the probe to the hand-held unit. The probe is long and thin, and has the same general shape as a glass thermometer. To use this kind of electronic thermometer, a nurse first covers the probe with a long thin disposable plastic probe cover that completely covers the probe. The disposable probe cover helps prevent the spread of disease by avoiding direct contact between the reusable probe and the germs in the patient's mouth. The nurse then puts the end of the probe under the patient's tongue. An electronic temperature sensor within the probe electrically senses the patient's temperature, and sends a signal to a microcomputer in the hand-held unit. The hand-held unit usually beeps when the temperature measurement is finished, and displays the patient's temperature on the display. The nurse can then remove the probe from the patient's mouth, strip the probe cover off the probe, and throw away the used disposable probe cover.

This type of electronic thermometer has achieved wide acceptance in hospitals because it is reasonably accurate, can be used with familiar placement techniques, and is (because of its disposable, replaceable probe covers) easily reusable for a number of different patients. Although the electronic hand-held unit is itself more expensive than most households are willing to pay, the overall cost of using this kind of electronic thermometer is relatively low because the disposable probe covers are inexpensive (two to three cents per cover, for example) and a single hand-held electronic unit may last for years and can be used to take the temperatures of many thousands of patients.

Electronic thermometers offer speed, ease of reading, and accuracy improvements over glass thermometers, and also eliminate the possibility of mercury poisoning. Although such electronic thermometers have achieved a fair degree of success, they have certain significant disadvantages. For example, they need to be constantly calibrated, are relatively easily broken, and often require a relatively long time (thirty seconds or more in many cases) to make an accurate measurement. There are also problems with taking a temperature from the patient's mouth due to breathing, keeping the thermometer under the patient's tongue, etc. Cross-contamination of infectious diseases is also a concern because the mouth is a "wet orifice."

More recently, a new kind of electronic thermometer has appeared on the market. This new kind of thermometer works by measuring the temperature of your eardrum. Since the eardrum is also known as the "tympanic membrane," these thermometers are sometimes called "tympanic thermometers."

Why the eardrum? The carotid artery that supplies blood to the hypothalamus—the body's temperature control center—passes through the eardrum. For this reason, the temperature of your eardrum corresponds very closely to the core temperature of your body. Although doctors and scientists have known this fact for many years, only since the mid-1980's have commercial devices been available to measure eardrum temperature in a clinical setting.

Ear or "tympanic" thermometers work by receiving and analyzing the radiant heat ("infrared") energy coming from the eardrum. Just as you can feel the heat when you hold your hands up in front of a warm fire, a tympanic thermometer can detect eardrum temperature without having to actually touch the eardrum by receiving the radiant heat energy coming from the eardrum.

Commercially available tympanic thermometers consist of a portable, hand-held battery powered main unit providing electronics, a display and a probe containing a "thermopile" or pyroelectric heat sensor. This special heat sensor called a "thermopile" is especially sensitive to the eardrum's radiant heat energy. Microelectronics can determine eardrum temperature from the electrical signals provided by the "thermopile" sensor. The thermopile's sensing probe or "nacelle" is typically an integral part of the tympanic thermometer's main unit—reducing the potential for breakage of the sensor assembly and (at least potentially) increasing reliability and accuracy.

The sensing probe typically has a tapered or cone shape for easy insertion into the outer ear canal. All of the commercially available tympanic thermometers accept disposable probe covers. These disposable probe covers further minimize the risk of spreading disease, and also promote cleanliness by preventing ear wax and other secretions from contacting the probe. Different manufacturers have different probe cover configurations (see FIGS. 1A–1B), but all of these probe covers have the common characteristic that they are relatively transparent to (and thus do not block or reduce) the radiant heat energy given off by the eardrum.

To use the ear thermometer, a nurse or other care provider inserts a disposable probe cover onto the instrument's sensing probe. Once the disposable probe cover is in place, the nurse or other caregiver inserts the covered probe into the patient's outer ear and then presses a button to command the instrument to make a measurement. The measurement time is usually very rapid—on the order of two seconds or less. The patient's temperature instantly shows on the instrument's display. The instrument may then be removed from the patient's ear, and the disposable cover can be stripped off the instrument and discarded.

Ear thermometry has advantages over other temperature measuring techniques:

The measuring time is very rapid—usually less than two seconds.

Because the ear is a dry orifice, cross-contamination is not much of an issue—and individual, disposable probe covers further reduce the already low cross-contamination risks.

The theoretical accuracy of the measurement is very high (for example, on the order of one tenth of one degree).

Because of the short measurement time and the use of the ear as the measuring point, it is possible to rapidly measure the temperature of children, invalids and sleeping patients—and in other situations where it is difficult to get a patient to sit still for thirty seconds with a probe under their tongue.

Despite these many clear advantages, ear thermometry has not yet achieved wide success in the medical marketplace. Even though many hospitals are believers in the concept of ear thermometry, the hospital market overall has converted less than twenty-five per cent of its temperature measurements to ear thermometry—and the hospitals that have converted are often displeased with their choice.

The main reason for past failures is that existing ear thermometer/probe cover combinations do not provide the high, repeatable accuracy required in a demanding hospital environment. Nurses are often unable to duplicate ear thermometer readings. If you try to measure the same person's temperature twice with existing commercial ear thermometer/probe cover combinations, you may get two very different readings. Since accurate, repeatable temperature measurements are important or even critical to medical diagnosis and treatment (for example, to detect a 101.5° F. hospital fever threshold or to establish a temperature pattern over time), it is important for temperature measurements to be as accurate and repeatable as possible.

For an ear thermometer to make an accurate, repeatable measurement, the ear thermometer probe must be aimed directly at the eardrum. Readings will be different unless the orientation of the probe within the ear is duplicated nearly exactly from one reading to the next. Because different structures within the ear give off, absorb and reflect different amounts and types of radiant energy, even slight differences in alignment between the probe sensor and the patient's eardrum can cause significant differences in the temperature reading.

Poor technique is the leading cause of ear thermometer inaccuracy and non-repeatability—and disposable probe cover design is an important factor in the nurse's ability to repeatably, correctly align the probe within the patient's ear. There have been several general approaches to tympanic thermometer probe cover design in the past. In one design approach, the disposable probe cover has a generally rigid structure designed to guide and place the probe (see FIGS. 1A & 1B for examples). In another design approach, the probe cover has very little structure, acting solely as a barrier against contamination and playing no role at all in probe placement (see FIGS. 1C & 1D for examples).

FIGS. 1A–1D show some examples of prior art tympanic thermometer probe covers. Prior art FIGS. 1A and 1B show examples of prior art probe covers that are designed to assist in guiding and placing the probe. The FIG. 1A prior art probe cover 10 is made by Thermoscan, Inc. of San Diego Calif. and marked with "U.S. Pat. No. 5,088,834". This probe cover 10 is made out of a single unitary piece of thin, lightweight, semi-rigid, stiff hollow translucent plastic material shaped into a cone 12. The cone 12 includes a thicker "shank" portion 18, and terminates in a thinner end portion 13 comprising an integral piece of thin plastic film 14 that is impervious to moisture but transparent to (and does not absorb) radiant heat energy at the infrared wavelengths emitted by the eardrum. The FIG. 1A one-piece probe cover 10 is designed to be inserted over a correspondingly cone-shaped probe. A surrounding retaining ring base 16 retains cover 10 on the probe during use. When cover 10 is inserted over the probe, plastic film 14 is stretched tightly over the end of the probe to provide a thin, wrinkle-free film "window" that is substantially transparent to infrared radiant energy. The conically shaped stiff "shank" portion 18 of cover 10 tapers to glide into the passageway of a person's ear leading to the eardrum—thus helping to position the probe relative to the eardrum. This stiff construction also allows probe covers 10 to be stacked one inside another for compact shipment.

FIG. 1B shows a different prior art probe cover 20 sold by Sherwood Medical Co. of St. Louis, Mo. (this design is also explained in Sherwood's U.S. Pat. Nos. 5,516,010, 5,293, 862, 5,179,936, 4,790,324, 4,662,360 and/or 4,602,642 and possibly also in a still-pending continuing application of these). The FIG. 1B probe cover 20 comprises a thick rigid plastic cone 22 for insertion into a person's ear. Probe cover 20 is made out of injection molded, rigid polyethylene or polypropylene white plastic. Small tabs or "ears" within the hollow inner space formed within plastic cone 22 retain cover 20 on a specially designed corresponding probe. Plastic cone 22 terminates in a circular opening 24. A retaining ring 26 formed around opening 24 retains a thin transparent polypropylene or polyethylene plastic film membrane 28. Film membrane 28 is in an unstretched and wrinkled condition when the cover is not in position over a probe. When rigid probe cover 20 is inserted over a probe, the film membrane 28 stretches over the probe end to remove the wrinkles and provide a thin, substantially transparent film layer of uniform thickness. This stretched film layer 28 allows infrared radiant energy to pass through and reach the infrared probe inside rigid probe cover 20 without letting fluid, earwax, germs or anything else from the ear cavity come into contact with the probe.

The rigidity of disposable probe covers 10, 20 shown in FIGS. 1A and 1B can help a nurse insert the probe into and position the probe within the patient's ear. The rigidity of these probe covers 10, 20 also facilitates easy ejection of the probe covers from the probe after measurement.

Unfortunately, this same rigidity makes these probe covers exceedingly uncomfortable for the patient. Because every person's ear has a different opening size, the "one size fits all" approach of the FIG. 1B probe cover 20 leads to discomfort and other problems. For example, probe cover 20 shown in FIG. 1B is known to become stuck in a person's ear, and can also scratch the inside of the ear. Frequently also, the probe tip will puncture the membrane film of the FIG. 1B probe cover when the clinician is inserting the thermometer into the probe cover.

The FIG. 1A probe cover 10 design is somewhat less uncomfortable than the FIG. 1B design, but the rather large diameter of conical shank 18 can be uncomfortable for some people. Moreover, its unitary, one-piece construction requires sophisticated techniques for drawing thin film portion 14 from the relatively thicker shank portion 18 during manufacture without puncturing the film. Also due to their rigidity, the FIG. 1A and FIG. 1B designs do not allow for total sealing of the ear canal to prevent external light and heat from entering during a measurement—degrading the accuracy and repeatability of temperature measurement.

FIGS. 1C and 1D show example prior art probe covers that follow a different approach of being mechanically transparent so as not to affect probe placement in any way. The FIG. 1C probe cover 30 is manufactured by Diatek, Inc. of San Diego, Calif. See U.S. Pat. No. Re. 34,599. This probe cover 30 includes a flat paper backing 32 that supports a piece of transparent film 34. Film 34 is stretchable, and completely envelopes the probe when cover 30 is placed over the probe—stretching tightly over the probe so as to provide a radiation-transparent film layer between the probe and the patient's ear. The FIG. 1C design has several advantages, including inexpensive construction, flat storage, and stackability. A big disadvantage of the FIG. 1C probe cover 30 is that the probe cover is of no assistance in reliably, repeatably positioning the probe within the person's ear. This probe cover 30 is designed to be used with a temperature sensing "gun" also manufactured by Diatek (see U.S. Pat. No. 4,863,281)—an unpopular design because of the bad connotations associated with putting a gun to someone's head.

FIG. 1D represents another prior art probe cover 40 manufactured by Exergen Corp. of Newton, Mass. and marked "U.S. Pat. No. 4,993,419." This disposable probe cover 40 comprises a film sheet 42 that is dispensed in a pre-perforated roll. In use, the nurse inserts a pin portion of the ear thermometer positioned opposite the probe into a first hole 44, and then wraps film 42 around the front of the probe and continues wrapping until a second hold 46 is aligned with the same pin portion. The nurse can then tear sheet 42 from the rest of the roll along the line of perforations 48. Holes 44, 46 retain sheet 42 on the probe during measurement. Although probe cover 40 is inexpensive to manufacture, it is difficult for a nurse to position properly onto the probe. In addition, the FIG. 1D probe cover 40 may not always reliably wrap around the front portion of the probe—creating wrinkles that can effect measuring accuracy. The FIG. 1D probe cover 40 can also slip off the probe without the nurse realizing.

The FIG. 1D cover also has repeatability problems. In actual use, clinicians regard repeatability as implying accuracy. If the same reading can be obtained from the same ear, within several tenths of a degree, then the thermometer is regarded as accurate, regardless of the actual core temperature of the patient. All of the manufacturers currently recommend that if a second temperature measurement is required, that it should be made in the other ear. The reason for this is not obvious, but it does have a tremendous bearing on a major problem concerning accurate measurements.

Simply stated, because the nacelles of tympanic thermometers are generally at or near room temperature, which can be up to forty degrees below patient core temperature, the nacelle can rapidly draw off heat from the ear canal, impacting successive measurements dramatically. An excellent demonstration of this effect is to place the Exergen unit in a patient's ear and leave it in place for about a minute, while taking temperatures every ten seconds during this time frame. The average decrease in readings is always several degrees over a minute. The Exergen models produce the most dramatic thermal reductions because the heat transfer is taking place between the ear canal, a FIG. 1D thin layer of film, and a large stainless steel mass. To a lesser extent, the FIG. 1A–1C probe cover designs exhibit the same, effect, albeit to a lesser extent.

As evidenced by the example prior art tympanic thermometer probe covers shown in FIGS. 1A–1D, there is a long felt but unsolved need for an ear thermometer disposable probe cover that:

is helpful to the nurse or other care provider in correctly, repeatably positioning the probe relative to the patient's eardrum, is inexpensive to make, is easy to place over the probe before use and easy to strip from the probe after use, is comfortable for the patient, and promotes measuring accuracy.

No prior solution meets all of these needs.

The present invention provides a new disposable probe cover for an ear thermometer that meets all of these needs and provides other advantages as well. The disposable probe cover provided by this invention is made from a compressible, deformable material such as plastic foam. The disposable probe cover provided by this invention has the following advantages:

Very easy to use.

Easy to strip off probe after use.

Much more comfortable to the patient.

Unlikely to lodge in the ear canal.

Foam provides a spring action to push itself out of the ear—helping to prevent it from becoming lodged in the ear.

Will not cause scratches or other abrasive injury.

Completely conformable, allowing a comfortable sealing of the ear canal.

The patient can detect proper sealing by the effect it has on the change of hearing—allowing the patient to confirm to the nurse that the probe is properly in position.

Prevents external light and heat sources from adding inaccuracies to the temperature measurement.

Provides excellent thermal isolation between the ear canal and the thermometer probe body—improving measurement accuracy by reducing thermal drift associated with the cold junction of a thermal pile-type measurement instrument.

Is an excellent thermal insulator and barrier. By limiting the amount of heat drawn off the ear canal, the ability to achieve repeatable measurements is greatly enhanced.

Provides extremely low emissivity in the infrared wavelength band of interest—further reducing error factors introduced through reflection within the ear canal.

Is inexpensive to manufacture.

Stretches over the probe to retain the probe cover without any special retention tabs or other mechanisms.

Can stretch to fit a variety of different configuration probes

Provides conforming resiliency that accommodate a wide range of different ear sizes without being uncomfortable.

Can, in one embodiment, provide an externally-bonded thin-walled pre-stretched barrier (which can be less than 0.0075 inches) of high-density polyethylene that is substantially transparent to infrared radiation of interest while providing an industry accepted form of infection resistance and control.

Can be inexpensively vacuum-formed (or compression molded) from a sheet of closed-cell foam that is dye cut and further laminated with a sheet of high density polyethylene.

Allows use of a variety of different oversized probe configurations.

In one embodiment, preferred black or darker color foam provides greater repeatability by blocking extraneous light, absorbing stray ambient light, and having very low emissivity with negligible thermal mass.

BRIEF DESCRIPTION OF THE DRAWINGS

These and other features and advantages provided by the present invention will be better and more completely understood by referring to the following detailed description of preferred embodiments in conjunction with the drawings of which:

FIGS. 1A–1D show some examples of prior art disposable ear thermometer probe cover designs;

FIGS. 6A–6F show examples of alternate preferred embodiment probe cover configurations;

FIGS. 9A–9C show example processes for manufacturing the preferred embodiment probe cover;

FIGS. 10A and 10B show an example one-piece preferred embodiment probe cover;

FIGS. 10C shows an example of how the probe cover shown in FIGS. 10A and 10B can accept a tympanic thermometer probe tip.

DETAILED DESCRIPTION OF PRESENTLY PREFERRED EXAMPLE EMBODIMENTS

Figure 2:
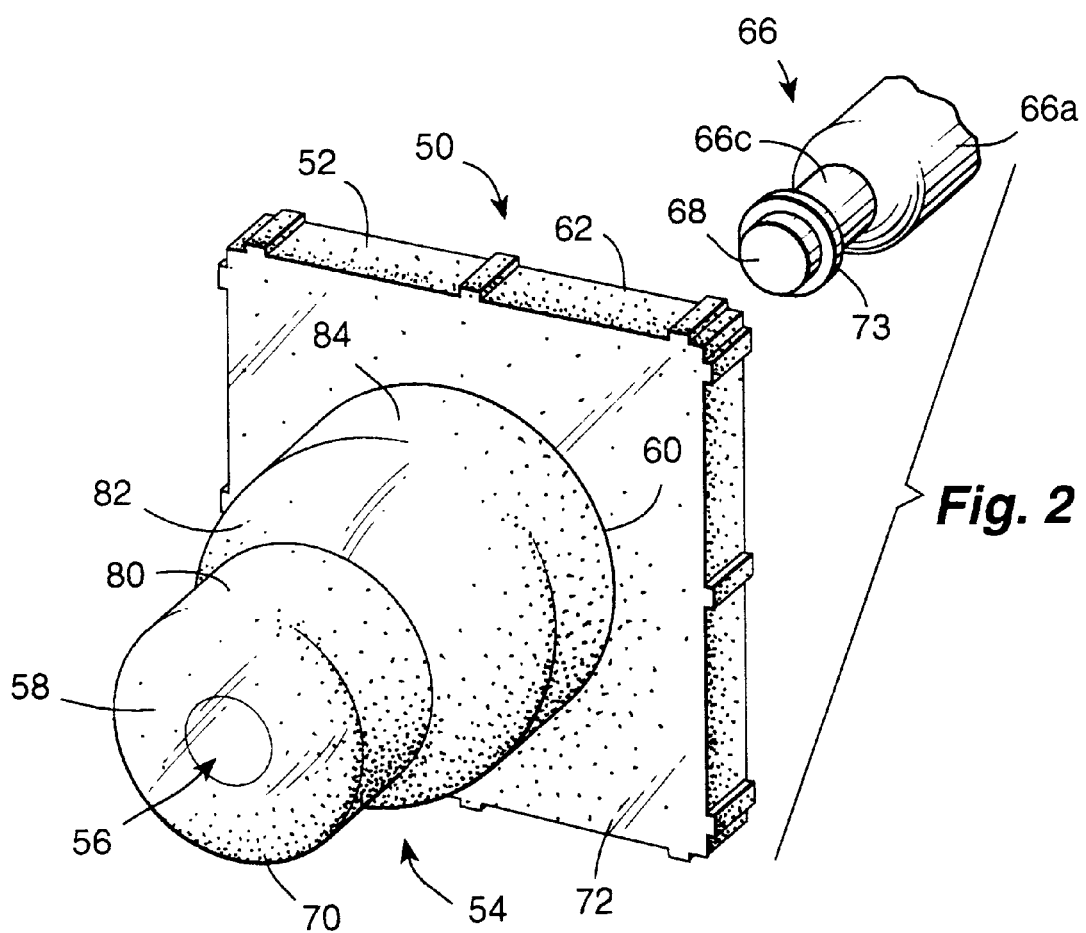
FIG. 2 shows an example disposable probe cover provided in accordance with this invention.

FIG. 2 shows an example disposable probe cover 50 provided by this invention. Probe cover 50 provides a cover or sheath for covering an ear thermometer radiant energy sensing probe 66. Probe cover 50 prevents germs and secretions within a person's ear canal 152 (see FIG. 3) from contacting probe 66 while being substantially invisible to infrared radiant heat energy emitted by the person's eardrum that is directed along the path toward probe sensing end 68.

FIG. 2 shows probe 66 before it has been inserted into and covered by probe cover 50. FIGS. 3, 3A, 4A, 4B and 5A show probe cover 50 in cross-section after the probe 66 has been inserted into and covered by the probe cover.

Probe cover 50 in the preferred embodiment is made of closedcell black plastic foam (e.g., a closed cell polyolefin foam such as polyethylene or polypropylene, thermoset closed-cell polyurethane foam, or expanded polystyrene foam). The foam may have a density of anywhere from 2 pounds to 6 pounds per cubic foot for example. In this embodiment, the foam wall thickness of the finished probe cover 50 will vary, but in the preferred embodiment may have a thickness of between $\frac{1}{16}$ and $\frac{3}{16}$ of an inch to provide a desired cushioning and sealing effect. The foam construction of probe cover 50 allows the probe cover to deform when inserted into a patient's ear (see FIGS. 3 and 3A)—sealing the patient's ear canal and providing a high degree of cushioning and comfort not available in any prior disposable probe cover design. The closed-cell foam construction probe cover 50 also provides a barrier that is impervious to germs, fluids and other secretions—further reducing the already low risk of cross-contamination.

Probe cover 50 in this embodiment is hollow, defining a central passageway 56 that accepts oversized sensor probes 66 of potentially different configurations. The foam construction of probe cover 50 allows the probe cover to stretch over the oversized probe 66—retaining the probe cover on the probe during use. The foam construction of probe cover 50 also provides a heat insulating effect—insulating the probe 66 from heat sources other than the eardrum the temperature of which is to be measured.

In more detail, probe cover 50 a base portion 62 and a hollow tubular projection 54—which may both be molded from the same foam sheet 52. Base portion 62 may be square in shape (and, in one embodiment, may have dimensions of 0.80 inches by 0.80 inches). Hollow tubular projection 54 projects outwardly from square base portion 62 (so that, in one embodiment, the total length of probe cover 50 may be 0.88 inches). Hollow tubular projection 54 has two ends 58, 60. The first end 58 (closest to the viewer in FIG. 2) is for insertion into a person's outer ear canal 152—see FIG. 3. The other end 60 joins and is integral with base 62.

Tubular projection 54 includes a central hollow passageway 56 disposed axially within and extending its length. This passageway 56 extends the entire length of probe cover 50, and in one example is defined along the central axis of projection 54. The passageway 56 terminates at an opening 64 at the projection first end 58, and at an opening 67 defined in an outer surface 69 of square base portion 62 (see FIG. 4A).

In use, a radiant energy temperature sensing probe 66 is inserted into passageway 56 through the base portion opening 67. The projection first end 58 is then inserted into the person's ear canal 152 (see FIG. 3). Infrared radiant heat energy emitted by the person's eardrum 150 (see FIG. 3A) passes through opening 64 and impinges upon the probe's sensing end 68 (which is now encased within the probe cover 50).

In this example, passageway 56 is dimensioned and shaped to accept an oversized heat sensing probe 66. Central passageway 56 terminates at end 58 in a substantially circular opening or window 64. The sensor end 68 of probe 66 (which may also be circular—and, in one example, forms the end of a circular infrared waveguide) is aligned with and aimed at probe cover circular opening 64 when probe 66 is inserted into probe cover 50. Radiant heat (infrared) energy can pass through opening 64 to impinge on probe sensing end 68.

In this example, the probe cover outer surface 71 has a cushioning obstruction 82 that prevents the probe cover 50 (and thus the probe 66) from being inserted too far into ear canal 152 and also providing a relatively fixed spacing between the probe end 68 and eardrum 150 each time the probe is inserted into the ear canal 152. In more detail, the preferred embodiment probe cover tubular projection 54 may comprise three sections: an end, insertion section 80; a middle, obstructing section 82; and a base joining section 84. In this particular example, sections 80, 82, 84 may have different diameters and shapes.

For example, insertion section 80 may be substantially circularly cylindrical with a uniform diameter along its length extending 0.13 inches radially outwardly from the edge of circular window 64. Insertion section 80 is preferably shaped and dimensioned to conveniently and easily slide into ear canal 152 without discomfort.

Middle obstructing 82 in this example preferably has a diameter that is substantially larger than that of end section 80 so it won't slide into the ear canal 152. Middle, obstructing section 82 acts as a "stop" to limit how much of probe cover 50 that can be inserted into the ear canal 152. In this example, middle section 82 may have a spherical shape providing an abrupt increasing diameter such that it acts as a stop—abutting against the ear lobe and/or other part of the auricle (see FIG. 3A) to limit penetration of probe cover 50 into ear canal 152—and also providing a sealing effect (discussed below). The rapidly increasing diameter of the probe cover middle, obstructing section 82 helps ensure repeatable temperature measurements by positioning probe end 68 the same distance from eardrum 150 each time the covered probe 66 is inserted into a given patient's ear. This constant distance between probe end 68 and ear drum 150 is helpful in reliably establishing a temperature pattern over time.

Base joining section 84 in this example may have a diameter that is slightly reduced relative to the maximum diameter of middle section 82. The purpose of base joining section 84 is simply to join the rest of projection 54 to base 62.

Although the particular shape and outer contours of probe cover 50 shown in FIG. 2 provides various advantages, modifications to this shape may be desirable in certain situations. FIGS. 6A–6E show some possible alternate configurations for probe cover 50. These alternate configurations are preferably each made from a foam sheet but may provide different outer surface shapes. For example:

FIG. 6A shows a modified probe cover 50a that eliminates tubular base portion 84, and provides a cylindrical end portion 80 and a middle portion 82A shaped as a hemisphere.

FIG. 6B shows another example foam probe cover 50b that provides a flat ledge 86 in the transition region between end section 80 and tapered portion 82A. This flat ledge 86 may abut against the ear lobe or other part of the auricle to provide a positive stop preventing further insertion of probe cover 50 into ear canal 152.

The FIG. 6C probe cover 50c design provides an extending projection 54c that is uniformly linearly tapered.

The probe cover 50d design shown in FIG. 6D provides a projection 54d that is tapered as an ellipsoid to provide a hemispherical shape.

FIG. 6E shows a still additional probe cover design 50e in which the projection 54e has a complex tapered shape.

FIG. 6F shows a probe cover design 50f in which projection 54f has a conical shape terminating in a bulbous end portion, and has a hexagon shaped base portion 62f.

In one embodiment, probe cover internal central passageway 56 may be formed to match the outer surface contour of probe 66. This feature is shown most clearly in FIGS. 4A & 4B. In the particular example shown for illustrative purposes, probe 66 comprises a cylindrical portion 66a, a bulbous center portion 66b, and a terminal cylindrical portion 66c that terminates in probe sensing end 68. In this particular example, the diameter of terminal cylindrical portion 66c is less than the diameter of cylindrical portion 66a—and the bulbous center portion 66b has a generally hemispherical shape having the same diameter as that of cylindrical portion 66a. The shape of passageway 56 generally matches the shape of probe 66 except that the outer dimensions of the probe are greater than the inside dimensions of the passageway. Thus, in this example the probe cover internal passageway 56 may similarly define a lower cylindrical hollow 56a, a bulbous center hollow 56b, and an upper cylindrical hollow 56c communicating with one another to form a continuous passageway. In this embodiment, the probe 66 is "oversized" with respect to passageway 56 in this example in that:

(a) the inner diameter of probe cover internal passageway lower cylindrical hollow 56a is less than the diameter of probe cylindrical portion 66a;

(b) the inner diameter or probe cover passageway bulbous hollow 66b is less than the outer diameter of probe bulbous portion 66b; and (c) the inner diameter of probe cover internal passageway upper cylindrical hollow 56c is less than the outer diameter of probe cylindrical terminal portion 66c.

When probe 66 is fully inserted into the probe cover internal passageway 56, the probe cover 50 stretches and conforms around probe 66 (due to its foam construction) to form a tight friction fit. Compare FIG. 4A with FIG. 4B. In this particular embodiment, the probe bulbous portion 66b mates with the probe cover bulbous hollow 56b to hold the probe cover 50 on the probe 66. More specifically, in this particular embodiment, the foam material defining the probe cover bulbous hollow 56b expands and stretches around the probe bulbous portion 66b to prevent axial movement of the probe 66 relative to the probe cover 50 (and thus ear canal 152 and eardrum 150) during measurement. The tight friction fit provided by the stretching of the foam material over probe 66 is aided by a high surface tension between the foam and the probe 66 to provide good retention. The coefficient of friction between the foam surface and the probe 66 is high due to the molecular interaction between the two surfaces. The stretchable characteristic of foam also cover 50 allows the cover the adapt to a variety of differently dimensioned (and/or shaped) probes 66.

In one particular example, the probe cover end 58 may be covered by a sanitary barrier 70. Barrier 70 may, in one embodiment, cover the entire outer surface 72 of probe cover 50—or it can be placed across opening 64. Barrier 70 prevents germs, fluids, ear wax and other contaminants from passing through opening 64 into contact with probe 66.

Barrier 70 in one embodiment may comprise a thin clear high-density pre-stretched polyethylene plastic film sheet. For example, barrier 70 may be a plastic film membrane in the range of 0.0005" and 0.010" thick. Barrier 70 is substantially transparent to infrared radiant energy in the wavelength range of 8 to 14 microns emitted by the human eardrum—allowing such radiant energy to pass substantially unimpeded from the eardrum through circular opening 64 and passageway 56 to strike probe sensing end 68.

In use, barrier 70 across circular opening 64 should be of uniform thin thickness without any bumps, wrinkles, distortions or other obstructions. In this particular example, barrier 70 comprises a plastic film that is pre-stretched across opening 64 in an entirely unwrinkled state at time of manufacture. Barrier 70 therefore has no wrinkles in it at any time. Since probe cylindrical portion 66c may in one example be oversized (and/or include an oversized portion 73) with respect to probe cover internal passageway cylindrical hollow 56c as discussed above, inserting the probe 66 into cover 50 may cause the barrier 70 to further stretch across opening 64—from an already pre-stretched condition to a further stretched condition. The expansion of probe cover 50 around oversized probe 66 (e.g., structure 73) may cause the normally-stretched barrier 70 to stretch even further across window 64 to provide a uniformly thin (e.g., less than 0.0075") high-density barrier that is impervious to germs and other contaminants but substantially transparent to at least a part of infrared radiant energy within the wavelength range emitted by eardrum 150. Deformation of foam based probe cover 50 upon contact with the ear may cause barrier 70 to stretch still further. More specifically, when the probe cover 50 is inserted into ear canal 152, the cover deforms axially outwardly to further stretch the barrier 70. This additional stretching of barrier 70 does not have any adverse effects so long as the barrier doesn't stretch so much that it punctures. Since the thickness of barrier 70 during measurement is a factor in the temperature reading, it is desirable to have different individual probe covers 50 provide about the same amount of stretching for insertion of a given probe 66.

Probe sensing end 68 may be positioned any desired distance from barrier 70 when the probe 66 is fully inserted into probe cover 50. However, since the barrier 70 can never be a 100% transparent to radiant energy (and will generally exhibit some reflectivity characteristics), it is desirable to control the distance between the probe sensing end 68 and the barrier 70 so as to provide a higher degree of measurement repeatability. Therefore, in this particular example, the mating of probe bulbous portion 66b with the corresponding stretch-fit probe cover passageway bulbous hollow 56b causes probe sensing end 68 to be disposed some fixed axial, repeatable distance from (without contacting) the barrier 70 pre-stretched across and covering the opening 64.

Figure 3:
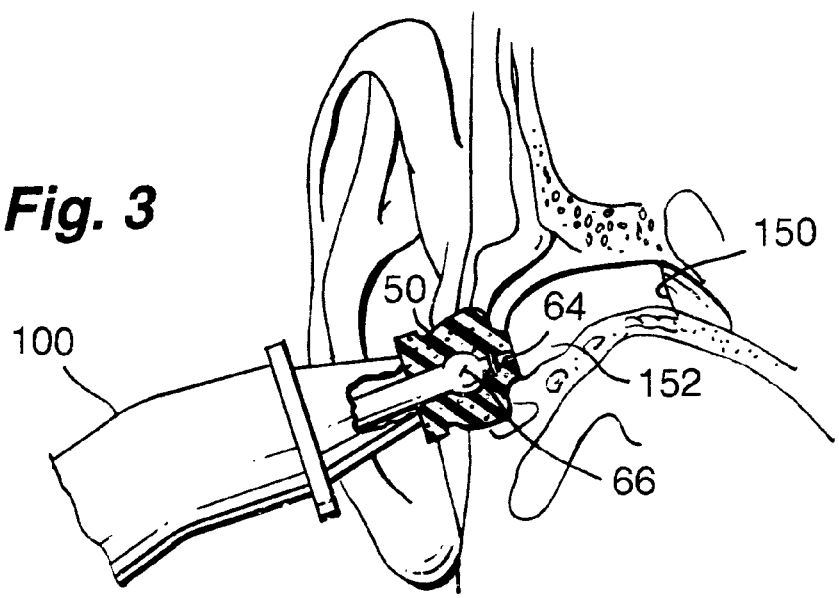
FIG. 3 shows an example of how the FIG. 2 probe cover can be used with a tympanic thermometer to make an accurate, repeatable temperature measurement.
Figure 3A:
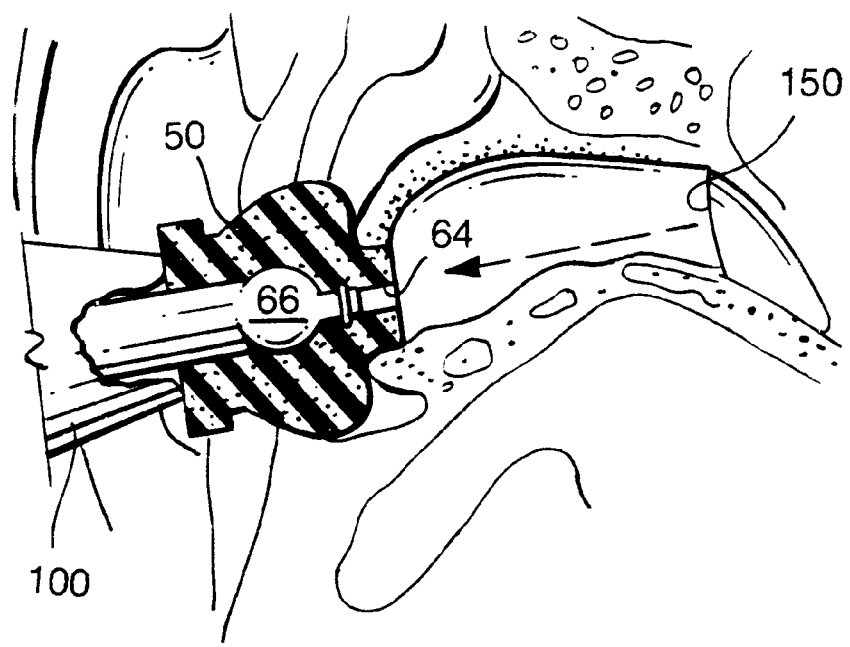
FIG. 3A shows a more detailed view of how the preferred embodiment probe cover provided by this invention seals the ear passage while providing sufficient resilient conformal support to assist a nurse in repeatably positioning the infrared probe relative to the person's eardrum.

FIGS. 3 and 3A show how probe cover 50 can be used with a tympanic thermometry instrument 100 to make a temperature measurement. Probe 66 is first fully inserted into the probe cover central passageway 56 by inserting probe sensing end 68 into base opening 67 and then exerting pressure. Because of its deformable, stretchable foam construction, probe cover 50 stretches over probe 66 to provide a friction fit that securely retains the probe cover on the probe's outer surface—and also compensates for differences in shape and dimensions for differently configured probe heads.

Conforming the central passageway 56's inner surface to the probe 66's outer surface also exactly aligns the probe sensing end 68 with the probe cover window 64.

The nurse or other care provider then inserts probe cover 50 insertion end 58 into the external acoustic meatus (ear canal) 152 of the patient. Probe cover insertion end 58 easily slides into ear canal 152. Because of its compressible foam construction, probe cover 50 conforms to the shape and dimensions of the ear canal 152—provide a high degree of patient comfort and also sealing the ear canal to prevent external light, air currents and radiant heat from entering the ear canal during temperature measurement. Such external heat, air currents and/or light can affect the temperature measurement. Additionally, since the foam has an extremely low emissivity in the wavelength bands of interest, it further reduces error factors introduced through reflection within ear canal 152. For example, black foam provides very low emissivity and thermal mass, and also absorbs ambient light. White colored foam can also be used. The foam color can be chosen to provide optimal radiant and optical characteristics (i.e., passivity, emissivity, absorption and reflectivity).

As mentioned above, the foam construction also provides a useful cushioning effect that keeps the hard surfaces of probe 66 away from the ear canal 152, provides a generally comfortable feel, and easily accommodates ear canals 152 having different sizes and shapes. See FIG. 3A. It keeps patient discomfort to a minimum, and is unlikely to lodge in the ear canal 152 or cause abrasive injury. Anyone who has ever had their temperature taken with a prior art rigid probe cover 50 as shown in FIGS. 1A and 1B will remember how uncomfortable the experience was. The soft, supple foam construction of preferred embodiment probe cover 50 provides an altogether different, much more pleasing experience. With probe cover 50 inserted the patient may feel pressure and will also have his or her hearing muffled due to the probe cover's sealing effect (e.g., as if you put your ear up to a sea shell). Thus, the patient can tell when the probe cover 50 has been fully inserted—an additional benefit if the patient is taking his or her own temperature (or to help train nurses in using proper temperature measuring technique). The inserted probe cover 50 does not feel like a too-big, hard object—the sensation most people experience with the prior art probe cover designs of FIGS. 1A and 1B.

The preferred embodiment probe cover 50 provided by the present invention also provides a useful positioning function—guiding and centering probe 66 within ear canal 152 to aim probe 66 more or less directly at eardrum 150. This centering and aiming function provided by probe cover 50 improves the measuring accuracy and repeatability of tympanic thermometer 100 by ensuring that probe 66 is aimed at eardrum 150 and assumes more or less the same position relative to the eardrum and the ear canal 152 each time the probe is inserted into the same patient's ear canal. While some of the aiming and guiding responsibility still falls upon the nurse's technique (for example, how he or she grasps the instrument 100 relative to the patient's ear canal 152), probe cover 50 is helpful in this guiding and placement function.

Probe cover 50 also performs an important insulating function. Because foam is a natural insulator, it provides excellent thermal isolation of the ear canal 152 and the probe 66 (in particular, the so-called "cold junction mass" within the thermopile sensor of the thermometer 100 nacelle). The largest degree of error in any thermopile-type measurement instrument is usually the thermal drift associated with the cold junction. The foam construction of probe cover 50 dramatically reduces the $\Delta Temp/\Delta Time$ relative to contact with the ear canal 152—reducing such thermal drift and improving measurement accuracy and repeatability. The ability to achieve repeatable measurements from the same or different ear is greatly enhanced by the insulative effect of probe cover 50 limiting the amount of heat drawn off the ear canal.

Figure 5A:
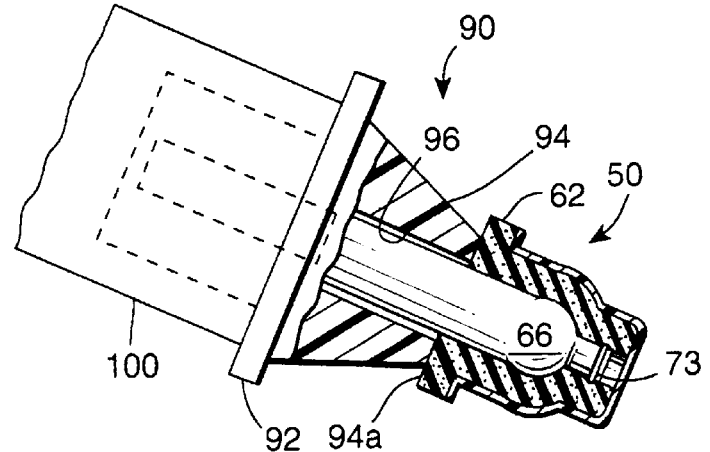
FIGS. 5A and 5B show how the preferred embodiment probe cover can be easily ejected from the probe.
Figure 5B:
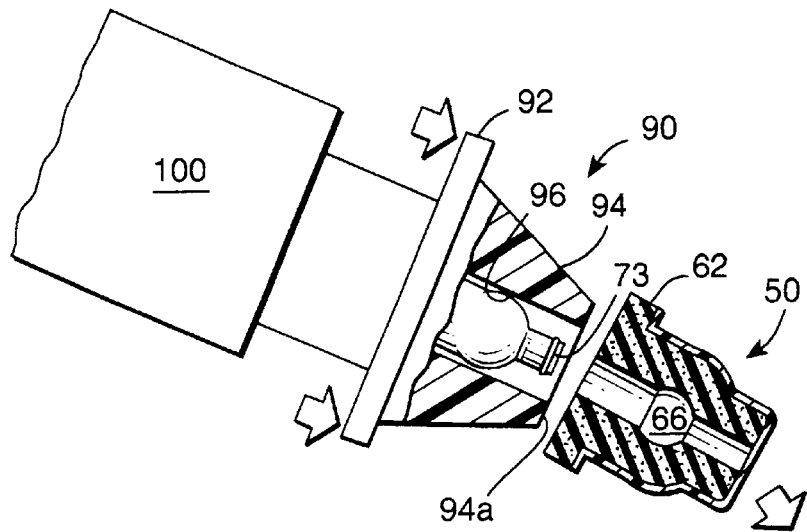

Once the measurement is completed, disposable cover 50 can be stripped from probe 66 and discarded. One way to strip cover 50 from probe 66 is simply to grasp the cover with the hands and pull it off the probe. However, it is desirable to make the stripping operation as simple, fast and easy as possible while minimizing contact between the nurse's hands and any portion of cover 50 that has been in contact with the patient. FIGS. 5A and 5B show how probe cover 50 can be easily stripped from instrument 100 after use through use of an ejecting ring structure 90.

In this example, instrument 100 may be equipped with a retractable ejection ring structure 90. Ejection ring structure 90 may be moved between two positions: a retracted position (as shown in FIG. 5A) and an extended, ejecting position (as shown in FIG. 5B). Ejection ring structure 90 may include an annular grasping portion 92 and a conical stripping ring 94. Probe cover base 62 may abut an upper surface 94*a* of stripping ring 94 and the probe 66 may pass through a central cylindrical passage 96 within the ejection ring structure 90 when the probe cover 50 is fully inserted onto probe 66 and the ejecting ring structure is in the retracted position. To strip probe cover 50 from probe 66, the user simply moves ejection ring structure 90 from its retracted position to its ejecting position. In the ejecting position, ejection ring structure 90 may extend fully over probe 66 (see FIG. 5B)—overcoming the friction between the probe cover and the probe and stripping off the probe cover.

Figure 7A:
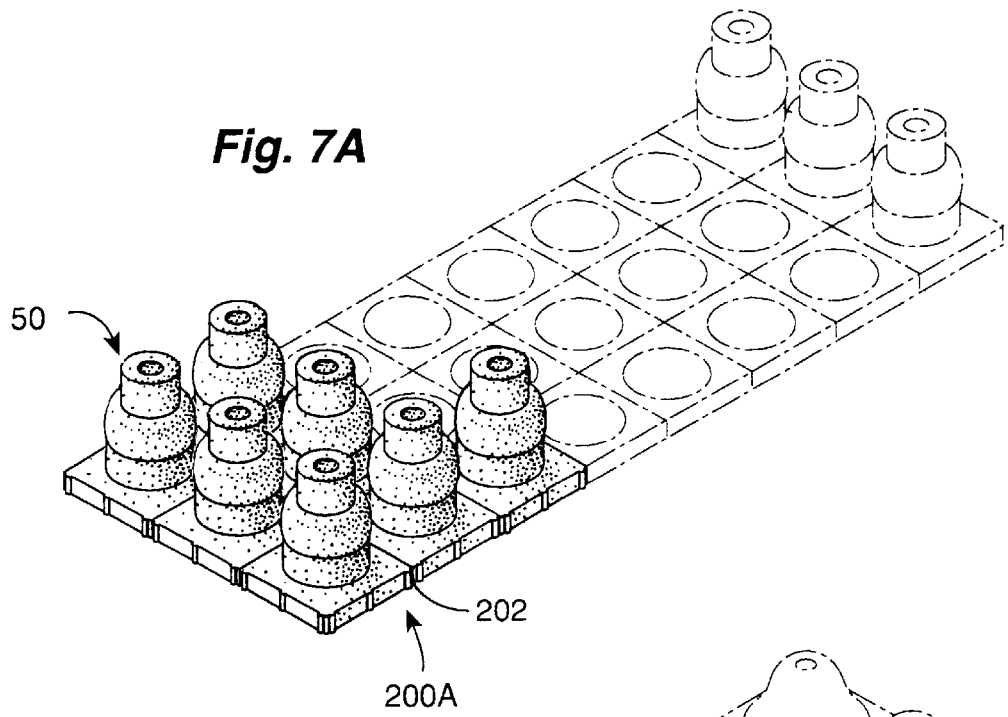
FIGS. 7A–7C show examples of how multiple probe covers can be packaged and distributed in a common, pre-perforated block.
Figure 7B:
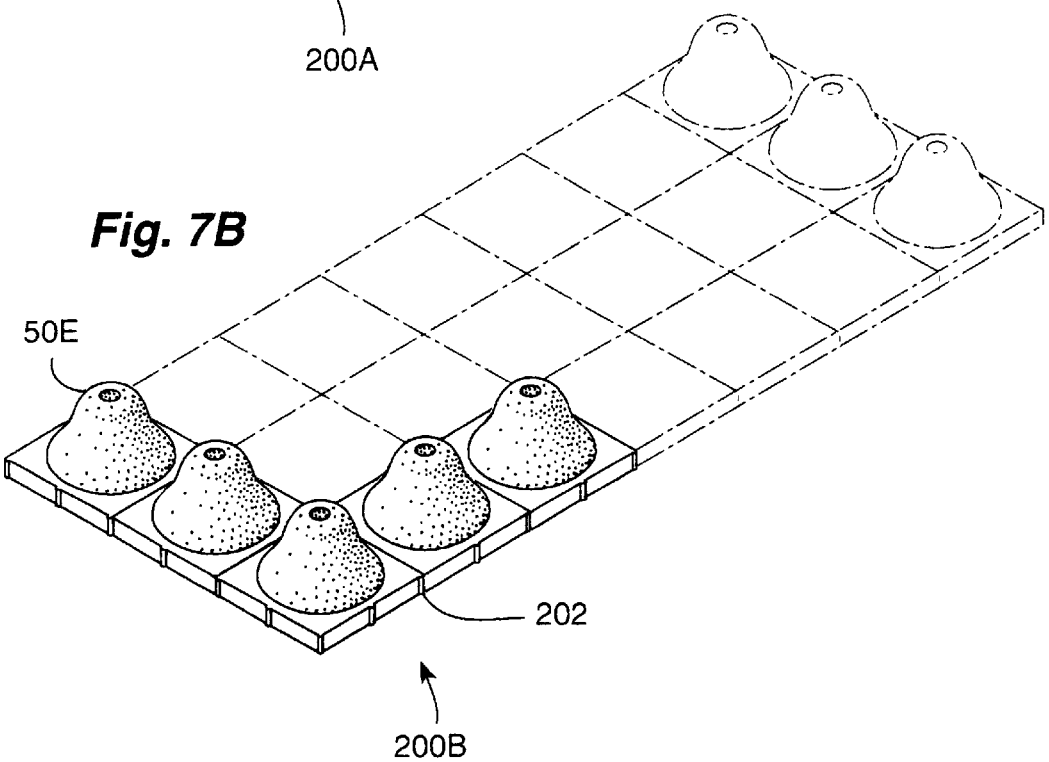
Figure 7C:
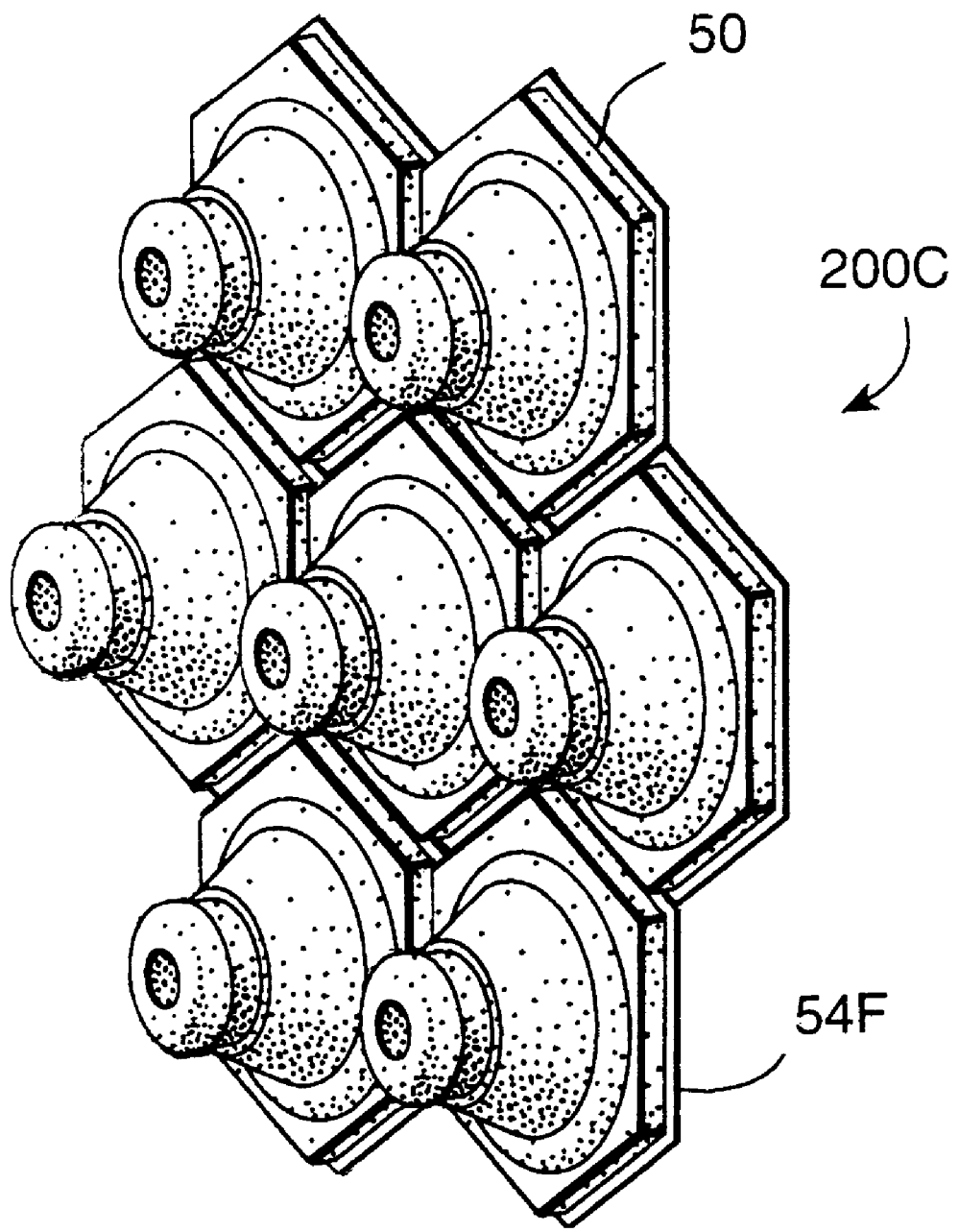

It also is desirable to help the nurse insert probe 66 into a probe cover 50 as easily and rapidly as possible without requiring the nurse to touch, with his or her hands, any part of the cover that will be placed into direct contact with the patient. FIG. 7A–7C show how multiple foam probe covers 50 can be distributed together in the form of a block 200 for use with a dispensing tray 300 shown in FIG. 8. By way of example, the block 200*a* shown in FIG. 7A comprises twenty-one individual probe covers 50 of the type shown in FIG. 2. FIG. 7B shows a block 200*b* of twenty-one probe covers 50*e* of the type shown in FIG. 6E. FIG. 7C shows a block 200*c* of probe covers 50*f* of the type shown in FIG. 6F, the hexagonal base portions 54*f* providing a very compact packing density so many probe covers can be provided in a small flat surface area. In each case, the individual probe covers 50 are attached together by small foam fingers extending across a cut or perforated line 202. Probe covers 50 can be easily separated from one another by application of a small amount of mechanical pulling force—but stay attached to one another during shipment and handling of block 200 as a whole.

Figure 4A:
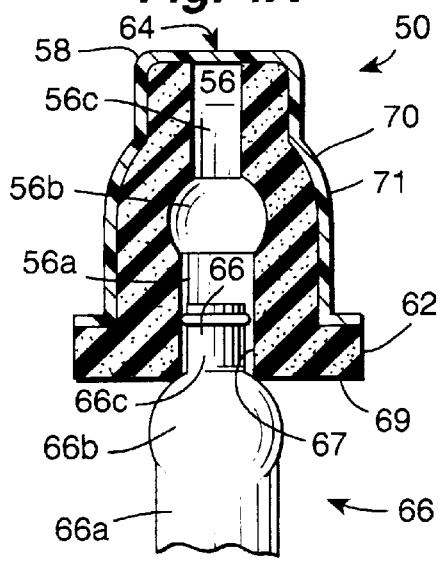
FIGS. 4A and 4B show how the preferred embodiment probe cover can accept and stretch over an oversized probe.
Figure 4B:
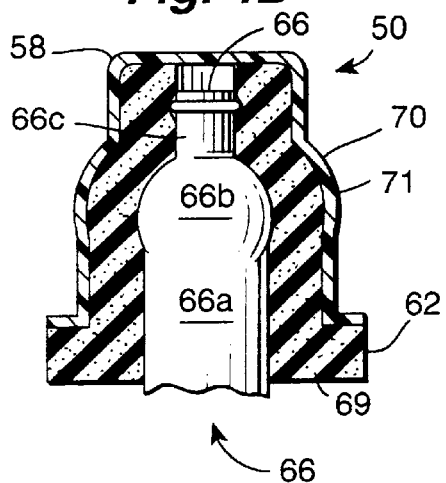
Figure 8:
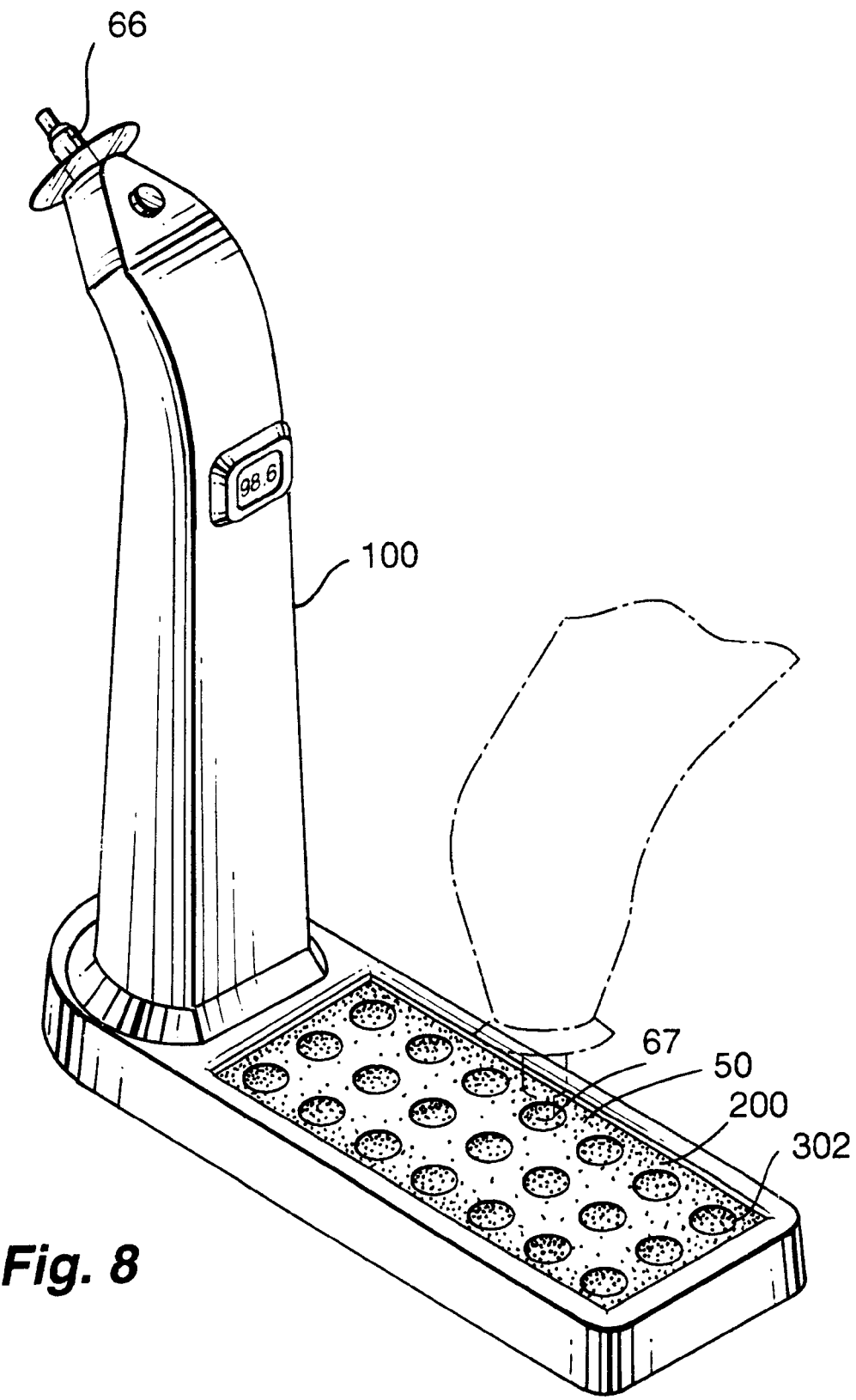
FIG. 8 shows an example ear thermometer and associated probe cover dispenser tray designed to accept the probe cover block shown in FIGS. 7A–7C.

FIG. 8 shows an example probe cover dispenser tray 300 designed to accept and dispense a probe cover block 200. In this example, the probe cover block 200 is inserted into a rectangular tray opening 302 defined by tray 300, with the probe cover projecting portions 54 facing downward into the tray. This leaves opening 67 into which probe 66 is to be inserted completely exposed. To attach an individual probe cover 50 to probe 66, a user may grasp the tympanic thermometer instrument 100 and insert probe 66 into probe cover opening 67 (see phantom lines in FIG. 8). The nurse then pushes probe 66 downwardly into probe cover passage 56—deforming and stretching the probe cover as shown in FIG. 4B to provide a tight frictional, high surface tension fit between the probe cover and the probe.

The probe 66 may stretch the foam composition of probe cover 50—causing the already stretched barrier 70 to become further stretched. The probe head expanded portion 73 helps to further stretch barrier 70 without requiring any contact between the probe end 68 and the barrier 70. Gently pulling the thermometer 100 away from tray 300 will provide enough force to separate the individual probe cover 50 from block 200—leaving probe 66 fully inserted into probe cover passage 54. The advantage of using the dispensing tray 300 shown in FIG. 8 is that it allows a nurse to very rapidly cover probe 66 with a probe cover 50 without having to ever touch or otherwise contact the outer probe cover surface 71 that is to come into contact with the patient. As discussed above, the barrier 70 may become still further stretched from its already-stretched position upon insertion of probe cover 50 into the ear canal 152 due to the outward deformation of the probe cover upon contact with the structures of the ear.

Figure 9C:
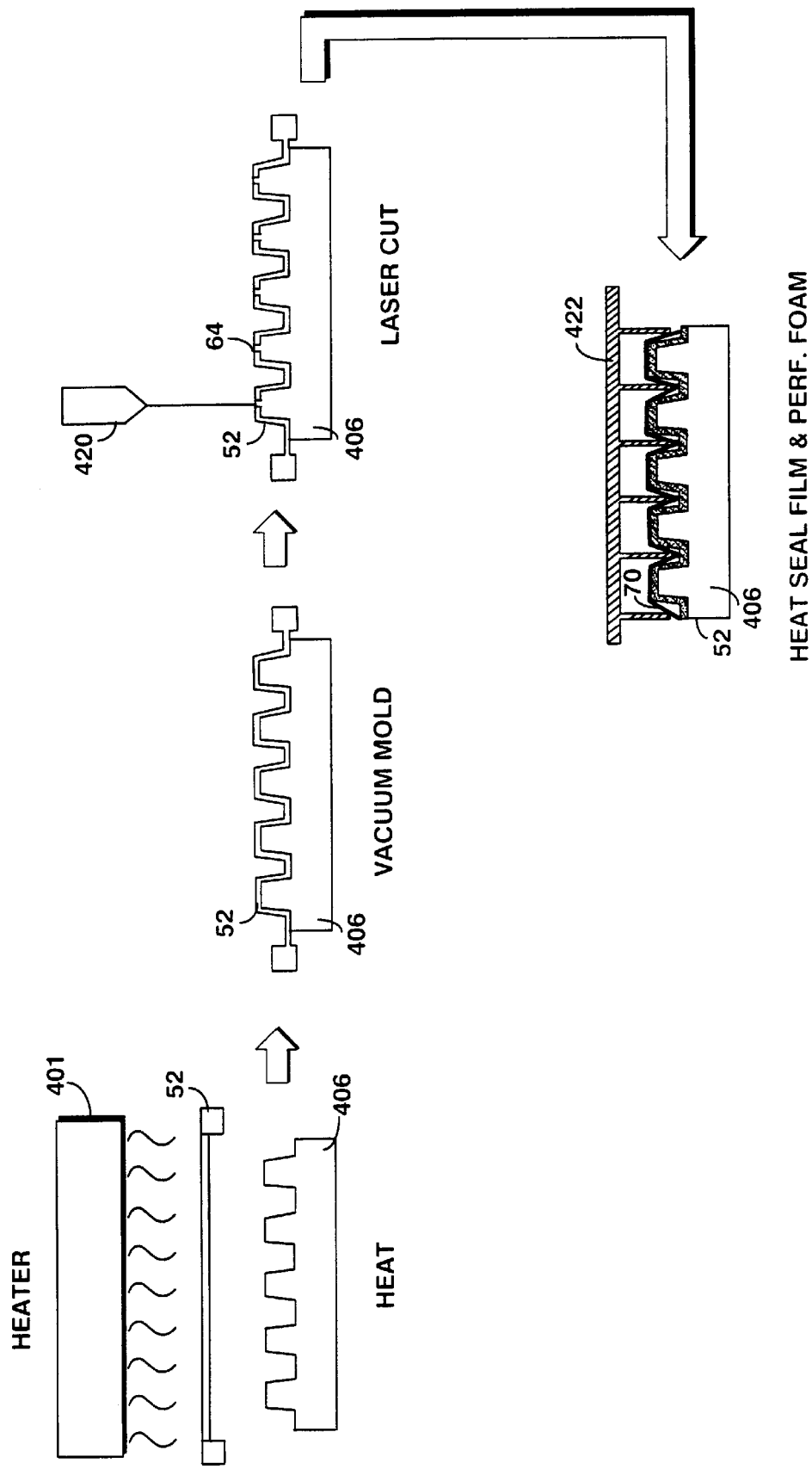

FIGS. 9A–9C show different example processes for manufacturing probe covers 50. In the FIG. 9A example, a foam sheet 52 of desired thickness (for example, between $1/64^{th}$ of an inch and $1/4$ of an inch—and preferably between $1/16$ and $3/16$ of an inch thick) is heated by a heater 401, and is then placed between two mating compression halves 402, 404. The compression mold halves 402, 404 are shaped to provide the desired probe cover shape and inner passageway 54 shape (see FIGS. 6A–6E). In this example, the compression mold process may be used to pinch form the passageway 54. The compression mold halves 402, 404 may the be opened and the resulting formed sheet 52' may then be held in place on a workpiece 406 (or on lower mold half 404) by a vacuum. A film sheet 70 of desired thickness is then laminated on top of the formed foam sheet 52' using a hot die 408 that also punches opening 64 and provides perforations 202 between individual probe covers 50—or a numerically controlled ("NC") laser cutting device can be used to cut the perforations between the individual probe covers. Film sheet 70 may be laminated over the entire molded foam sheet 52', or it may also be cut so as to cover a smaller surface area—but at least all of openings 64.

In the FIG. 9B example manufacturing process, a foam sheet 52 is heated by a heater 401 and is then placed onto a heated vacuum workpiece 406 that vacuum forms the foam sheet into the desired shape. A punch 410 cuts openings 64 into the sheet 52 to form individual probe covers 50. The same or different heater 401 is used to reheat the formed, punched foam sheet 52'. A film sheet 70 is then drawn down and sealed to provide a laminated film seal covering openings 64. A perforator 412 is then used to cut the perforations between the individual finished probe covers 50 to allow for separation of the individual pieces.

In the FIG. 9C example, heater 401 is used to heat the foam sheet 52 and a vacuum workpiece 406 forms the foam sheet into the desired shape as shown in FIG. 9B. A laser 420 is then used to cut the holes 64 (and can also be used to cut the perforation between probe covers). Film 70 is then placed over the foam 52 and a heated die 422 is lowered into position. Pressure exerted by heated die 422 pre-stretches film 70 over holes 64, and the heat from the die bonds film 70 to foam 52 to maintain the film in a pre-stretched, wrinkle-free state. The film 70 is not pre-heated except locally along the edges of the perforations. Because the film 70 is heated only locally, it does not sag or become loose or wrinkled in the neighborhood of hole 64 but instead remains tightly stretched across the hole.

EXAMPLE ONE-PIECE PROBE COVER

FIGS. 10A and 10B show a further embodiment of a foam-based probe cover 500 in accordance with this invention. Probe cover 500 in this example is made of one piece from a single foam sheet.

In this example, probe cover 500 includes a base 502 and a projection 504 extending away from the base. Base 502 and projection 504 are made from the same foam sheet in this example. Projection 504 is soft, flexible and resilient—but it also is sufficiently stiff that it retains its shape and springs back to its original shape after being deformed.

Base 502 in this example is substantially flat (it can be any desired shape such as circular, square, hexagonal, etc.). Projection 504 is formed as a closed continuous hollow dimple or cone that projects from base 502. In more detail, projection 504 is hollow in that a cavity 508 is formed within the projection. Projection cavity 508 is dimensioned to accept a tympanic thermometer probe tip (see FIG. 10C). Projection 504 provides a thin layer between the probe tip and the patient's ear canal that protects against cross-contamination but still allows the tympanic thermometer probe to receive infrared radiation from the eardrum.

A circular opening 506 through base 502 communicates with the cavity 508 defined within the projection 504 (see FIG. 10B). Cavity 508 terminates in a thin, closed section 512 integral with the projection 504 and base 502. In one example, closed section 512 is formed from the same foam sheet as the rest of probe cover 500, and is therefore also made of foam.

Closed section 512 is very thin (e.g., on the order of 0.5 to 1 mil thick) so that it is substantially transmissive to infrared radiation in the wavelength range of interest. In this example, the thickness of closed section 512 is much less than the thickness of projection walls 515. In this example, the thickness of closed portion 512 is closely controlled to provide very uniform infrared transmissivity from one probe cover 500 to another. Despite its thin width, closed section 512 prevents bacteria and other biological material from crossing the boundary it forms between the volume outside of probe cover 500 and the volume within cavity 508.

Probe cover 500 is designed so that the end of the probe tip does not contact the closed portion inner surface 514, nor does the inner surface 512 stretch over the tympanic thermometer probe tip, when the probe tip is inserted into cavity 508 (see FIG. 10C). In one example, an annular seat 518 (shown in phantom in FIG. 10B) may be formed around the circumference of closed portion inner surface 514 to prevent the probe tip from contacting the closed portion inner surface. Such an annular seat 518 can maintain a clearance of on the order of 0.0005 inches (for example) between the closed section inner surface 514 and the closed portion inner surface 514 (see FIG. 10C).

In another example, no special seat structure such as 518 is provided, but the cavity inner walls 510 are dimensioned so that when the probe tip is inserted into the cavity 508, the material of the inner walls gathers or "bunches up" near closed section 512 to prevent the probe tip from contacting the closed section inner surface 514. In this example, projection 504 is sufficiently stiff that closed section 512 is constantly under tension and is therefore unwrinkled and pre-stretched—even when no probe tip is inserted into the projection.

To use probe cover 500, the clinician may insert the probe cover 500 into a fixture having a form-fitting opening that is slightly larger than the circumference of projection 504. A probe tip can then be inserted through opening 506 and into cavity 508. The cavity inner foam wall 510 may, for example, stretch over the probe tip to frictionally engage the circumference of the probe tip—securely holding the probe cover 500 on the probe until the probe cover is stripped off after use.

Figure 11A:
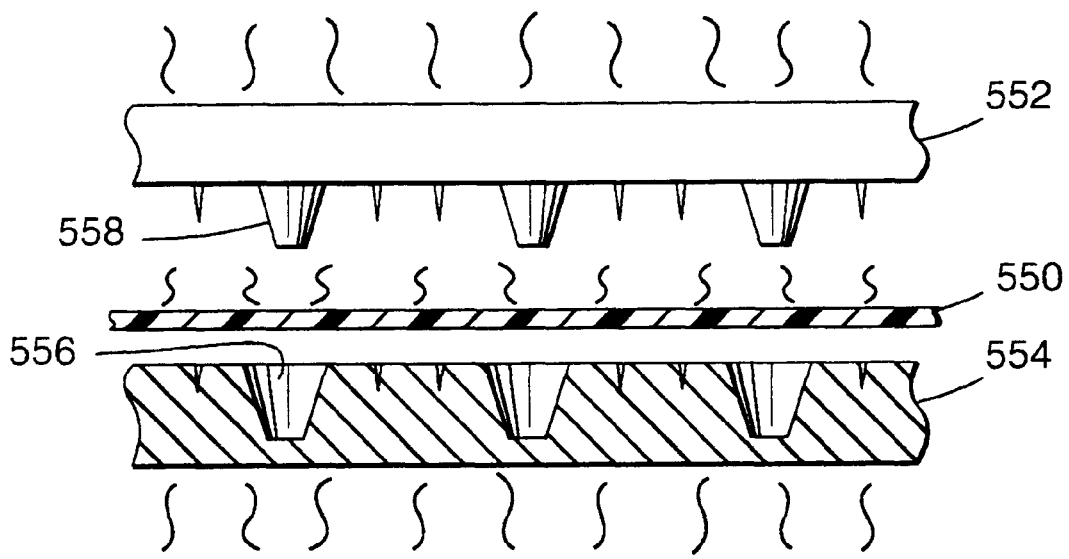
FIGS. 11A and 11B show an example process for making the one-piece probe cover shown in FIGS. 10A and 10B.
Figure 11B:
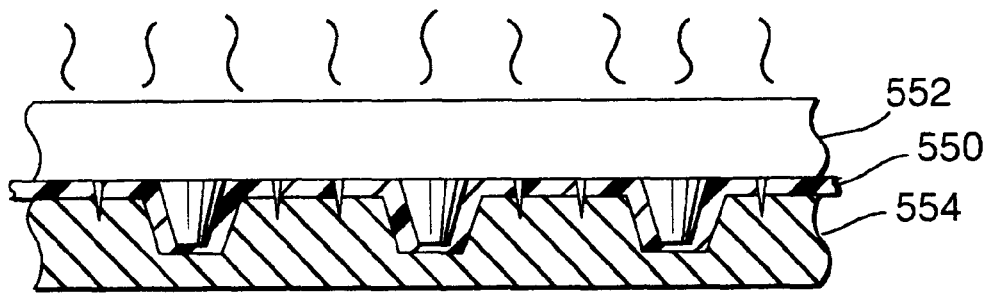

FIGS. 11A and 11B show one example of how to make the probe cover 500 of FIGS. 10A–10C. In this example, a sheet 550 of foam or soft polymeric material is placed between mating compression molds 552, 554. One or both of the compression mold halves (e.g., mold 552) is heated in this example, and foam sheet 550 may also be heated. The compression mold halves 552, 554 are then mated together with the sheet 550 between them. Compression mold 554 define cavities 556 corresponding to the desired outer form of probe cover 500, while compression mold 556 defines projections 558 corresponding to the inner form of probe cover 500. Because mold 552 is heated, the sheet 550 melts or flows somewhat during the time the molds 552, 554 are compressed together. Such melting or flowing reforms sheet 550 into the shape shown in FIGS. 10A and 10B.

When you are sick, you want to make sure your doctor has the most accurate information concerning your condition—and you also dread having to put up with uncomfortable procedures. They take your temperature many times a day in the hospital. The last thing you want is to feel uncomfortable every time they take your temperature. The prior art ear thermometer probe covers (see for example FIGS. 1A and 1B) are extremely uncomfortable because of their rigidity and other shortcomings. They can even get stuck in your ear, and they can scratch your ear. The present invention provides a new foam probe cover design that is much more comfortable and effective as compared to prior approaches.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A disposable probe cover for use with a radiant energy sensing probe, said disposable probe cover, in use, being separable from said radiant energy sensing probe and disposed of after use, said disposable probe cover comprising foam molded to provide a compressible, deformable hollow body having a passage defined therethrough, the passage being dimensioned for, in use, removably accepting at least a portion of said radiant energy sensing probe so that the deformable hollow body stretches over and thereby frictionally engages said probe, the passage terminating in an opening through which said probe is removably inserted, said molded foam body, in use, being separated from said radiant energy sensing probe and disposed of after said probe is used to allow said probe to be inserted into a further probe cover.

2. A disposable probe cover as in claim 1 further including a further opening defined by said foam body through which radiation can pass to reach the probe when the probe is inserted within said foam body, and a thin plastic film membrane laminated onto at least a portion of the body and pre-stretched across the further opening.

3. A disposable probe cover as in claim 1 wherein said probe has an outer profile that approximates the external acoustic meatus of the ear of a human subject, and said probe cover conforms to said probe outer profile so as to provide increased comfort when said probe and probe cover are inserted into said subject's ear.

4. A disposable probe cover as in claim 1 wherein said foam, in use, provides thermal isolation for said probe.

5. A disposable foam-based probe cover for use with a radiant energy sensing probe having an outer surface, said disposable foam-based probe cover, in use, being separable from said radiant energy sensing probe and disposed of after use, said disposable foam-based probe cover comprising a hollow body comprising a compressible foam material and having a cavity therein terminating in an opening, the probe cover, in use, accepting said radiant energy sensing probe that is oversized relative to said cavity, said foam-based probe cover at least partially deforming over said oversized probe when said probe is inserted through said opening so as to frictionally engage said probe outer surface and thereby removably retain said probe cover on said probe, said probe cover into which said probe has been inserted being shaped for insertion into the external acoustical meatus of ear of the human body, said foam providing a cushioning effect to increase the subject's comfort, said probe cover, in use, being stripped from said sensing probe without damaging said sensing probe after said probe and said probe cover are removed from said external acoustical meatus.

6. A disposable probe cover as in claim 5 wherein said probe has an outer profile that approximates the external acoustic meatus of the ear of a human subject, and said probe cover conforms to said probe outer profile so as to provide increased comfort when said probe and probe cover are inserted into said subject's ear.

7. A disposable probe cover as in claim 5 wherein said foam, in use, provides thermal isolation for said probe.

8. A disposable probe cover for use with a radiant energy sensing probe, said disposable probe cover, in use, being separable from said radiant energy sensing probe and disposed of after use, said disposable probe cover comprising:

a foam sheet molded to provide a compressible, deformable hollow body having a passage defined therethrough, the passage being dimensioned for, in use, accepting at least a portion of a radiant energy sensing probe so that the deformable hollow body stretches over and thereby frictionally engages said probe, the passage terminating in an opening through which said probe is, in use, removably inserted, said molded foam sheet, in use, being stripped from said radiant energy sensing probe without damaging said sensing probe, after said probe is used to allow said probe to be inserted into a further probe cover before re-use.

9. A disposable probe cover as in claim 8 wherein said probe cover defines a further opening, and further includes a thin plastic film membrane laminated onto at least a portion of the body and pre-stretched across the further opening.

10. A disposable probe cover as in claim 8 wherein said probe has an outer profile that approximates the external acoustic meatus of the ear of a human subject, and said probe cover conforms to said probe outer profile so as to provide increased comfort when said probe and probe cover are inserted into said subject's ear.

11. A disposable probe cover as in claim 8 wherein said foam in use, provides thermal isolation for said probe.

12. A disposable foam-based probe cover for use with a radiant energy sensing probe, said disposable probe cover, in use, being separable from said radiant energy sensing probe and disposed of after use, said disposable probe cover having a passageway defined therein, said probe cover comprising a hollow body comprising a compressible foam material, the probe cover, in use, accepting said radiant energy sensing probe that is oversized relative to the dimension of said passageway so that said compressible foam at least partially deforms over said radiant energy sensing probe and thereby frictionally engages said probe so as to removably retain said compressible foam on said probe during use, said probe cover and inserted probe being shaped for insertion into the external acoustical meatus of the ear of the human body, said probe cover, in use, being stripped from said radiant energy sensing probe without damaging said probe after said probe is used to allow said probe to be inserted into a further probe cover before re-use of said probe.

13. A disposable probe cover for use with a radiant energy sensing probe, said disposable probe cover in use, being separable from said radiant energy sensing probe and disposed of after use, said disposable probe cover comprising:

foam molded to provide a compressible, deformable hollow body having a passage defined therethrough, the passage being dimensioned for, in uses removably accepting at least a portion of said radiant energy sensing probe, the passage terminating in an opening through which said probe is removably inserted, said molded foam body, in use, being separated from said radiant energy sensing probe and disposed of after said probe is used to allow said probe to be inserted into a further probe cover, wherein said probe is oversized relative to said passage, and said foam at least partially deforms when said probe is inserted into said passage so as to removably, frictionally engage said probe.

14. A disposable probe cover for use with a radiant energy sensing probe, said disposable probe cover, in use, being separable from said radiant energy sensing probe and disposed of after use, said disposable probe cover comprising:

a foam sheet molded to provide a compressible, deformable hollow body having a passage defined therethrough, the passage being dimensioned for, in use, accepting at least a portion of said radiant energy sensing probe, the passage terminating in an opening through which said probe is, in use, removably inserted, said molded foam sheet, in use, being stripped from said radiant energy sensing probe without damaging said sensing probe, after said probe is used to allow said probe to be inserted into a further probe cover before re-use, wherein said probe is oversized relative to said passage, and said foam at least partially deforms when said probe is inserted into said passage so as to removably, frictionally engage said probe.

* * * * *

Adverse Decision In Interference

No. 6,030,117, Edward P. Cheslock, Eric L. Canfield, Richard K. Harris, TYMPANIC THERMOMETER PROBE COVER, Interference No. 104,708, final judgment adverse to the patentees rendered November 26, 2002, as to claims 1, 3-8 and 10-14.

*(Official Gazette January 14, 2003)*